United States Patent
You et al.

(10) Patent No.: US 9,877,315 B2
(45) Date of Patent: Jan. 23, 2018

(54) METHOD AND USER EQUIPMENT FOR TRANSMITTING CHANNEL STATE INFORMATION AND METHOD AND BASE STATION FOR RECEIVING CHANNEL STATE INFORMATION

(71) Applicant: LG ELECTRONICS INC., Seoul (KR)

(72) Inventors: Hyangsun You, Anyang-si (KR); Kijun Kim, Anyang-si (KR); Suckchel Yang, Anyang-si (KR); Jonghyun Park, Anyang-si (KR); Joonkui Ahn, Anyang-si (KR); Dongyoun Seo, Anyang-si (KR); Illsoo Sohn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 14/994,901

(22) Filed: Jan. 13, 2016

(65) Prior Publication Data

US 2016/0150509 A1 May 26, 2016

Related U.S. Application Data

(63) Continuation of application No. 14/405,369, filed as application No. PCT/KR2013/005306 on Jun. 17, 2013, now Pat. No. 9,271,283.

(Continued)

(30) Foreign Application Priority Data

Jun. 13, 2013 (KR) .................. 10-2013-0067776

(51) Int. Cl.
*H04W 72/04* (2009.01)
*H04L 5/00* (2006.01)
(Continued)

(52) U.S. Cl.
CPC .......... *H04W 72/042* (2013.01); *H04L 5/001* (2013.01); *H04L 5/0035* (2013.01);
(Continued)

(58) Field of Classification Search
CPC .................................................. H04W 72/042
See application file for complete search history.

(56) References Cited

U.S. PATENT DOCUMENTS

| 2011/0103247 | A1 | 5/2011 | Chen et al. | |
| 2011/0249578 | A1 | 10/2011 | Nayeb Nazar et al. | |
| 2012/0082049 | A1* | 4/2012 | Chen ..................... | H04W 24/10 370/252 |

FOREIGN PATENT DOCUMENTS

| CN | 102215591 | 10/2011 |
| EP | 2706778 | 3/2014 |

(Continued)

OTHER PUBLICATIONS

PCT International Application No. PCT/KR2013/005306, Written Opinion of the International Searching Authority dated Aug. 9, 2013, 18 pages.

(Continued)

*Primary Examiner* — Ronald B Abelson
(74) *Attorney, Agent, or Firm* — Lee, Hong, Degerman, Kang & Waimey

(57) ABSTRACT

The present invention provides a method and a device for transmitting or receiving channel state information (CSI). According to the present invention, when a user equipment can be set with one or more CSI processes per serving cell, a CSI request field included in downlink control information for a specific serving cell indicates at least whether a non-periodic CSI report triggered by the CSI request field is triggered for a set of CSI process(es) set by a higher layer from among the CSI process(es) for the one serving cell.

12 Claims, 11 Drawing Sheets

Related U.S. Application Data

(60) Provisional application No. 61/659,989, filed on Jun. 15, 2012, provisional application No. 61/667,409, filed on Jul. 2, 2012, provisional application No. 61/667,406, filed on Jul. 2, 2012, provisional application No. 61/695,289, filed on Aug. 30, 2012, provisional application No. 61/706,778, filed on Sep. 28, 2012.

(51) Int. Cl.
*H04W 24/10* (2009.01)
*H04W 88/02* (2009.01)

(52) U.S. Cl.
CPC .......... *H04L 5/0037* (2013.01); *H04L 5/0053* (2013.01); *H04L 5/0057* (2013.01); *H04W 24/10* (2013.01); *H04W 88/02* (2013.01)

(56) References Cited

FOREIGN PATENT DOCUMENTS

| | | |
|---|---|---|
| KR | 10-2009-0076784 | 7/2009 |
| KR | 10-2012-0016013 | 2/2012 |
| WO | 2012023007 | 2/2012 |

OTHER PUBLICATIONS

Huawei, et al., "CSI feedback modes for CoMP," 3GPP TSG RAN WG1 Meeting #69, R1-121946, May 2012, 3 pages.
PCT International Application No. PCT/KR2013/005306, Written Opinion of the International Searching Authority dated Aug. 9, 2013, 13 pages.
Korean Intellectual Property Office Application Serial No. 10-2013-0067776, Notice of Allowance dated Jul. 15, 2014, 3 pages.
Fujitsu, "Email discussion [69-11]: FFS aspects of aperiodic CSI feedback for CoMP", 3GPP TSG RAN WG1 Meeting #69, R1-122931, May 2012, 22 pages.
Nec, et al., "Way Forward on Aperiodic CSI Feedback for CoMP," 3GPP TSG RAN WG1 #69, R1-123016, XP50601237, May 2012, 4 pages.
Panasonic, "Uplink Signalling for Carrier Aggregation Enhancement," 3GPP TSG-RAN WG1 #66bis, R1-113115, XP50538255, Oct. 2011, 4 pages.
European Patent Office Application Serial No. 13804295.7, Search Report dated Feb. 10, 2016, 9 pages.
European Patent Office Application Serial No. 13804295.7, Office Action dated Oct. 6, 2017, 7 pages.
State Intellectual Property Office of the People's Republic of China Application Serial No. 201380031569.8, Office Action dated Oct. 26, 2017, 14 pages.
Pantech, "CSI feedback mode for DL CoMP", 3GPP TSG RAN WG1 Meeting #69, R1-122445, May 2012, 4 pages.

\* cited by examiner

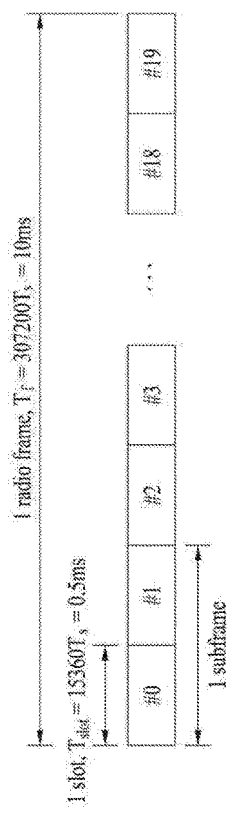
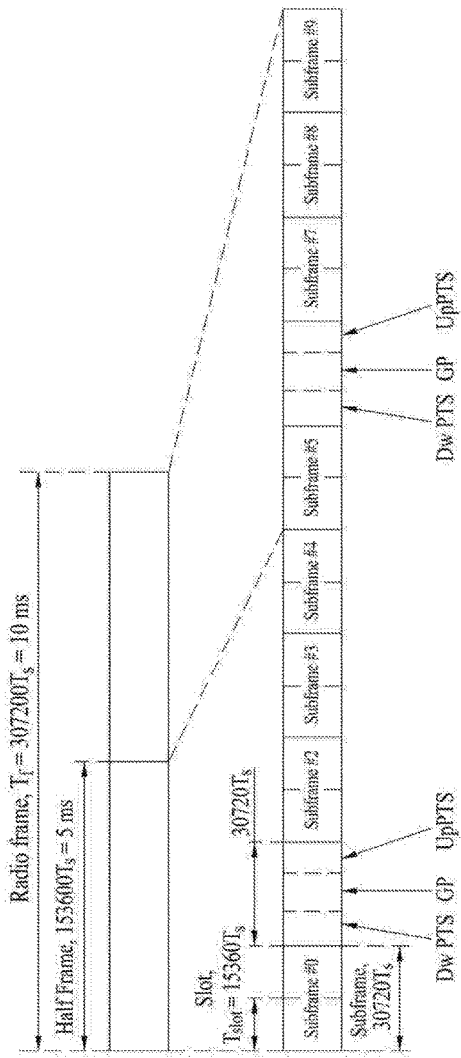

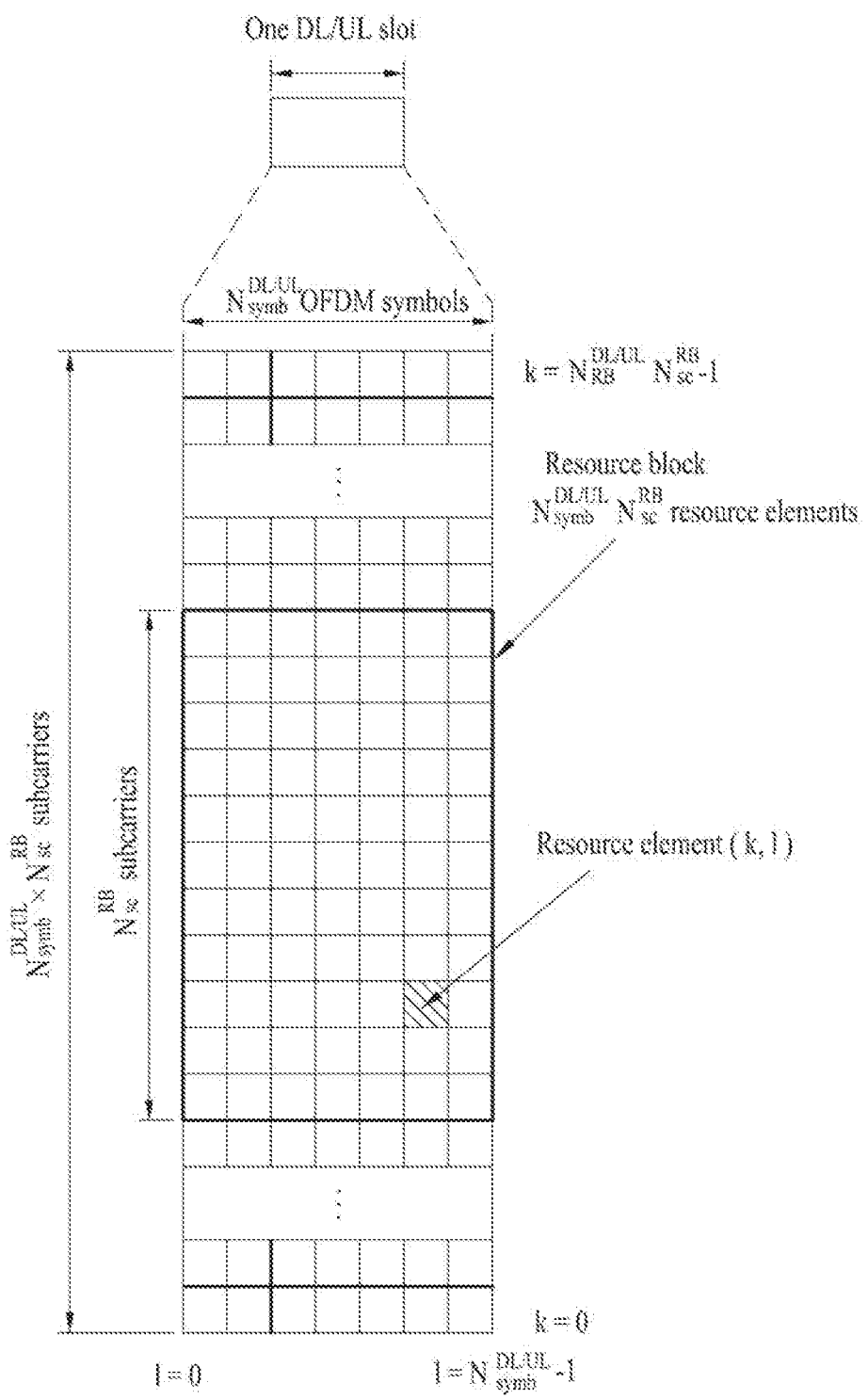

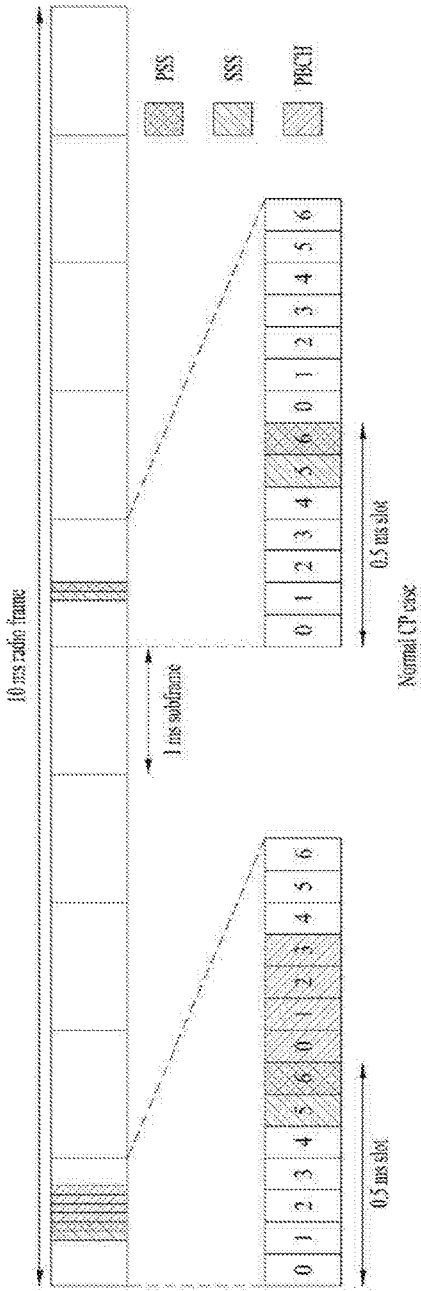
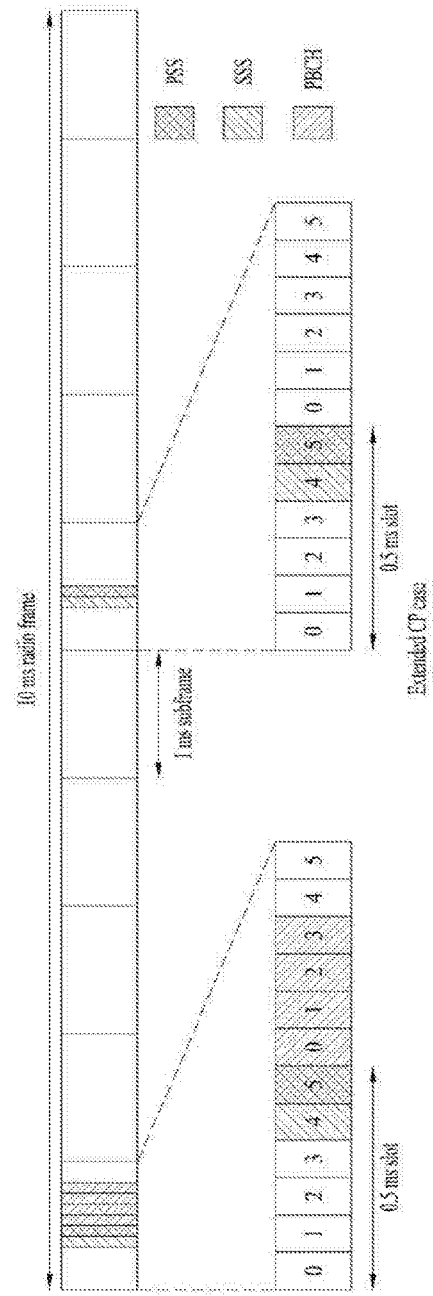

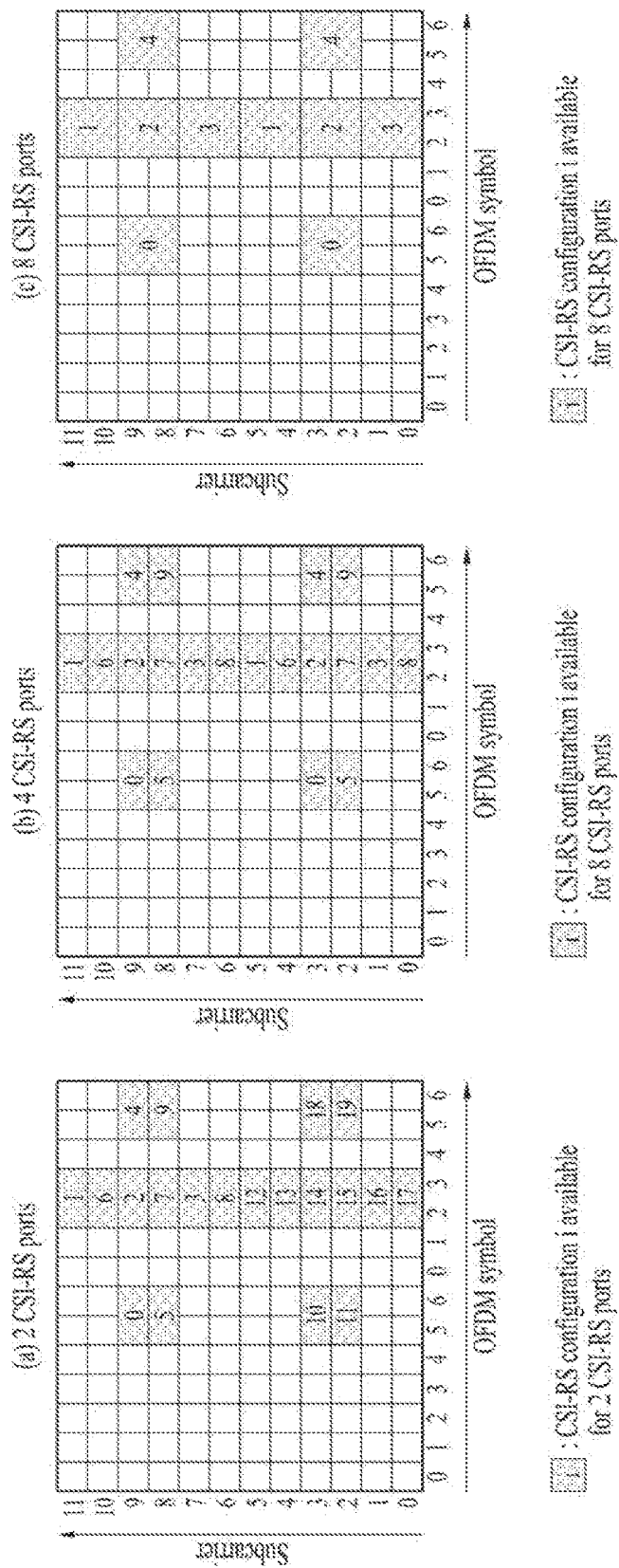

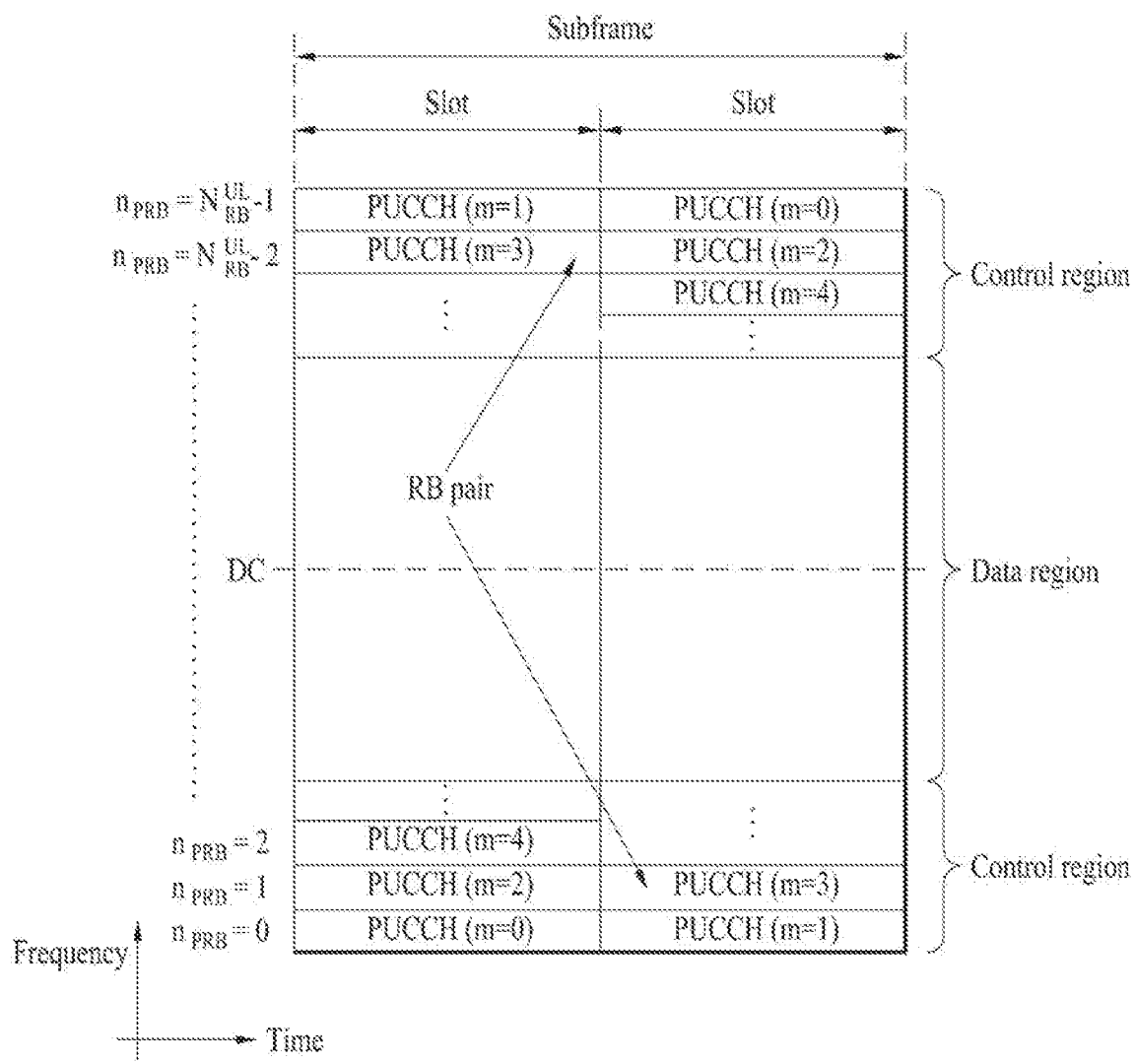

METHOD AND USER EQUIPMENT FOR TRANSMITTING CHANNEL STATE INFORMATION AND METHOD AND BASE STATION FOR RECEIVING CHANNEL STATE INFORMATION

CROSS-REFERENCE TO RELATED APPLICATIONS

This application is a continuation of U.S. application Ser. No. 14/405,369, filed Dec. 3, 2014, now U.S. Pat. No. 9,271,283, which is the National Stage filing under 35 U.S.C. 371 of International Application No. PCT/KR2013/005306, filed on Jun. 17, 2013, which claims the benefit of earlier filing date and right of priority to Korean Patent Application No. 10-2013-0067776, filed on Jun. 13, 2013, and also claims the benefit of U.S. Provisional Application Nos. 61/659,989, filed on Jun. 15, 2012, 61/667,409, filed on Jul. 2, 2012, 61/667,406, filed on Jul. 2, 2012, 61/695,289, filed on Aug. 30, 2012, and 61/706,778, filed on Sep. 28, 2012, the contents of all of which are hereby incorporated by reference herein in their entireties.

TECHNICAL FIELD

The present invention relates to a wireless communication system and, more particularly, to a method and apparatus for transmitting or receiving channel state information.

BACKGROUND ART

With appearance and spread of machine-to-machine (M2M) communication and a variety of devices such as smartphones and tablet PCs and technology demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

In addition, a communication environment has evolved into increasing density of nodes accessible by a user at the periphery of the nodes. A node refers to a fixed point capable of transmitting/receiving a radio signal to/from the UE through one or more antennas. A communication system including high-density nodes may provide a better communication service to the UE through cooperation between the nodes.

Such a multi-node cooperative communication scheme in which a plurality of nodes performs communication with the UE using the same time-frequency resource has much better data throughput than a conventional communication scheme in which the nodes perform communication with the UE without any cooperation by operating as independent BSs.

A multi-node system may perform cooperative communication using a plurality of nodes, each node operating as a BS, an access point, an antenna, an antenna group, a radio remote head (RRH), or a radio remote unit (RRU). In addition, even though a plurality of nodes does not directly participate in signal transmission or signal reception simultaneously, since the nodes are capable of performing signal transmission/reception while reducing mutual interference therebetween, overall communication system throughput can be raised.

Unlike a conventional centralized antenna system in which antennas converge upon a BS, the nodes are typically separated from each other by a predetermined interval or more in the multi-node system. The nodes may be managed by one or more BSs or BS controllers for controlling the operation thereof or scheduling data transmission/reception therethrough. Each node is connected to the BS or BS controller for managing the node through a cable or a dedicated line.

Such a multi-node system may be regarded as a type of MIMO system in that distributed nodes are capable of communicating with a single UE or multiple UEs by simultaneously transmitting/receiving different streams. However, since the multi-node system transmits signals using nodes distributed at various locations, a transmission region which should be covered by each antenna decreases in comparison with antennas included in the conventional centralized antenna system. Accordingly, compared with a conventional system implementing MIMO technology in the centralized antenna system, a transmit power needed when each antenna transmits a signal may be reduced in the multi-node system. In addition, since the transmission distance between an antenna and a UE is shortened, path loss is reduced and high-speed data transmission is achieved. Therefore, transmission capacity and power efficiency of a cellular system can be enhanced and communication performance having relatively uniform quality can be satisfied irrespective of the locations of UEs in a cell. Furthermore, in the multi-node system, since BS(s) or BS controller(s) connected to multiple nodes performs cooperative data transmission/reception, signal loss generated in a transmission process is reduced. In addition, when nodes distant from each other by a predetermined distance or more perform cooperative communication with the UE, correlation and interference between antennas are reduced. Hence, according to the multi-node cooperative communication scheme, a high signal to interference-plus-noise ratio (SINR) can be achieved.

Due to such advantages of the multi-node system, in the next-generation mobile communication system, the multi-node system has emerged as a new basis of cellular communication through combination with or by replacing conventional centralized antenna systems in order to reduce additional installation costs of a BS and maintenance costs of a backhaul network and simultaneously to expand service coverage and enhance channel capacity and SINR.

DETAILED DESCRIPTION OF THE INVENTION

Technical Problems

Since communication up to now has been mainly performed between a single node and a UE, a scheme in which the UE reports a channel state has also been established based on a single carrier and the single node. A new channel state reporting scheme is needed in consideration of a situation in which a plurality of carriers is used for communication for the UE and/or a situation in which a plurality of nodes coordinate to provide the UE with a communication service.

The technical objects that can be achieved through the present invention are not limited to what has been particularly described hereinabove and other technical objects not described herein will be more clearly understood by persons skilled in the art from the following detailed description.

Technical Solutions

In an aspect of the present invention, provided herein is a method for transmitting channel state information (CSI) by a user equipment. The method comprises: receiving downlink control information for a specific serving cell, the downlink control information including a CSI request field; and performing an aperiodic CSI report on a physical uplink shared channel (PUSCH) of the specific serving cell, wherein the aperiodic CSI report is triggered by the CSI request field. The CSI request field may indicate whether or not the aperiodic CSI report is triggered for a set of CSI process(es) configured by a higher layer among CSI process(es) for the serving cell when the user equipment can be configured with one or more CSI processes per serving cell.

In another aspect of the present invention, provided herein is a method for receiving channel state information (CSI) by a base station. The method comprises: transmitting downlink control information for a specific serving cell to a user equipment, the downlink control information including a CSI request field; and receiving an aperiodic CSI report on a physical uplink shared channel (PUSCH) of the specific serving cell, wherein the aperiodic CSI report is triggered by the CSI request field.

In still another aspect of the present invention, provided herein is a user equipment for transmitting channel state information (CSI). The user equipment comprises: a radio frequency (RF) unit and a processor configured to control the RF unit, wherein the processor is configured to control the RF unit to receive downlink control information for a specific serving cell, the downlink control information including a CSI request field; and is configured to control the RF unit to perform an aperiodic CSI report on a physical uplink shared channel (PUSCH) of the specific serving cell, and the aperiodic CSI report is triggered by the CSI request field.

In a further aspect of the present invention, provided herein is a base station for receiving channel state information (CSI). The base station comprises: a radio frequency (RF) unit and a processor configured to control the RF unit, wherein the processor is configured to control the RF unit to transmit downlink control information for a specific serving cell to a user equipment, the downlink control information including a CSI request field; and is configured to control the RF unit to receive an aperiodic CSI report on a physical uplink shared channel (PUSCH) of the specific serving cell, and the aperiodic CSI report is triggered by the CSI request field.

In each aspect of the present invention, the CSI request field may consist of two bits.

In each aspect of the present invention, the user equipment may be configured with a plurality of serving cells including the specific serving cell. If the user equipment is configured in a mode in which a plurality of CSI processes can be configured for at least one of the serving cells, the CSI request field may indicate whether or not the aperiodic CSI report is triggered for the set of CSI process(es).

In each aspect of the present invention, each of the set of CSI process(es) is associated with a CSI reference resource for signal measurement and an interference measurement resource for interference measurement.

In each aspect of the present invention, the user equipment may receive the CSI request field in a user equipment specific search space.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, accuracy of channel state information (CSI) report can be reinforced in a situation in which a plurality of carriers is configured for a UE and/or a situation in which a plurality of nodes participates in communication with the UE.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

FIGS. 1(a) and 1(b) illustrate the structure of a radio frame used in a wireless communication system.

FIG. 2 illustrates the structure of a downlink (DL)/uplink (UL) slot in a wireless communication system.

FIGS. 3(a) and 3(b) illustrate a radio frame structure for transmission of a synchronization signal (SS).

FIG. 7 illustrates the structure of a UL subframe used in a wireless communication system.

FIG. 7 illustrates channel state information reference signal (CSI-RS) configurations.

FIG. 8 illustrates the structure of a UL subframe used in a wireless communication system.

MODE FOR INVENTION

Figure 4:
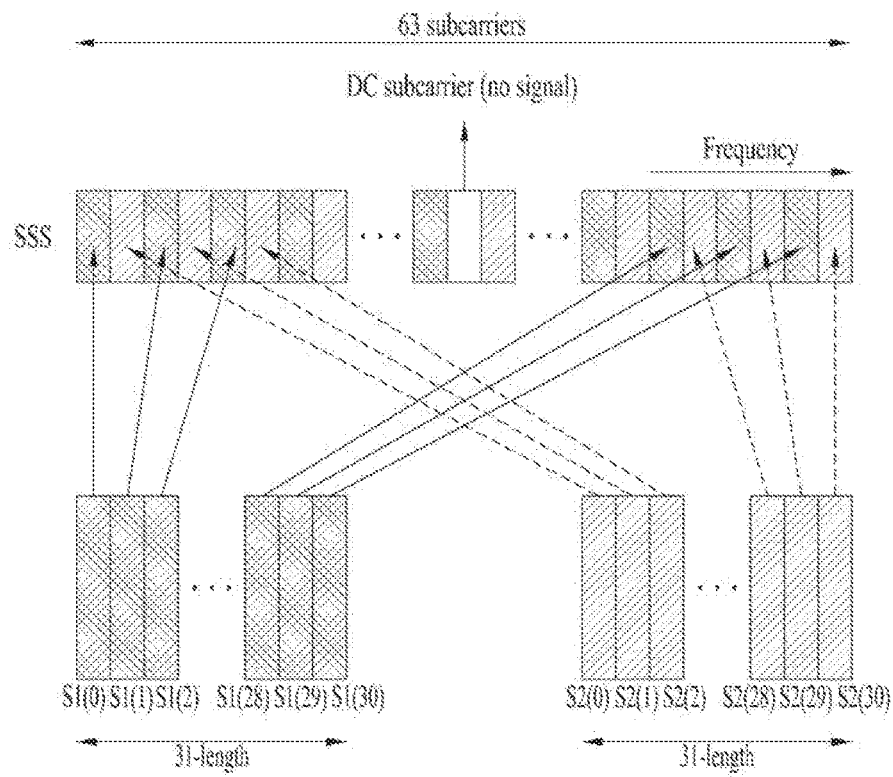
FIG. 4 illustrates a secondary synchronization signal (SSS) generation scheme.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point. In the multi-node system, the same cell identity (ID) or different cell IDs may be used to transmit/receive signals to/from a plurality of nodes. If the plural nodes have the same cell ID, each of the nodes operates as a partial antenna group of one cell. If the nodes have different cell IDs in the multi-node system, the multi-node system may be regarded as a multi-cell (e.g. a macro-cell/femto-cell/pico-cell) system. If multiple cells formed respectively by multiple nodes are configured in an overlaid form according to coverage, a network formed by the multiple cells is referred to as a multi-tier network. A cell ID of an RRH/RRU may be the same as or different from a cell ID of an eNB. When the RRH/RRU and the eNB use different cell IDs, both the RRH/RRU and the eNB operate as independent eNBs.

In the multi-node system, one or more eNBs or eNB controllers connected to multiple nodes may control the nodes such that signals are simultaneously transmitted to or received from a UE through some or all nodes. While there is a difference between multi-node systems according to the nature of each node and implementation form of each node, multi-node systems are discriminated from single node systems (e.g. a centralized antenna system (CAS), conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes may be applied to various types of multi-node systems. For example, a node refers to an antenna group spaced apart from another node by a predetermined distance or more, in general. However, embodiments of the present invention, which will be described below, may even be applied to a case in which a node refers to an arbitrary antenna group irrespective of node interval. In the case of an eNB including an X-pole (cross-polarized) antenna, for example, the embodiments of the preset invention are applicable on the assumption that the eNB controls a node composed of an H-pole antenna and a node composed of a V-pole antenna.

A communication scheme through which signals are transmitted/received via a plurality of transmit (Tx)/receive (Rx) nodes, signals are transmitted/received via at least one node selected from a plurality of Tx/Rx nodes, or a node transmitting a DL signal is discriminated from a node transmitting a UL signal is called multi-eNB MIMO or coordinated multi-point transmission/reception (CoMP). Coordinated transmission schemes from among CoMP communication schemes may be broadly categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, a wider variety of communication environments can be formed, compared to other CoMP schemes. JT refers to a communication scheme by which a plurality of nodes transmits the same stream to a UE and JR refers to a communication scheme by which a plurality of nodes receive the same stream from the UE. The UE/eNB combine signals received from the plurality of nodes to restore the stream. In the case of JT/JR, signal transmission reliability can be improved according to transmit diversity since the same stream is transmitted to/from a plurality of nodes. In JP, DPS refers to a communication scheme by which a signal is transmitted/received through a node selected from a plurality of nodes according to a specific rule. In the case of DPS, signal transmission reliability can be improved because a node having a good channel state between the node and the UE is selected as a communication node.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. An interfering cell refers to a cell interfering with a specific cell. Namely, if a signal of a neighboring cell interferes with a signal of a specific cell, the neighboring cell becomes an interfering cell with respect to the specific cell and the specific cell becomes a victim cell with respect to the neighboring cell. If neighboring cells interfere with each other or unilaterally, such interference is referred to as inter-cell interference (ICI). The UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region. The cell associated with the radio resources will be described later with reference to FIGS. 9 and 10.

Hereinafter, the term "cell" means a cell associated with the radio resource unless particularly mentioned as a cell of a geographical area. Accordingly, the term serving cell refers to a cell configured for a UE as the radio resources unless specified otherwise. However, "cell" in cell specific reference signal (CRS), "cell" in cell identity, and "cell" in physical layer cell identity may be cells of a geographical region rather than cells associated with the radio resources. Hence, in expressions of "CRS of a serving cell" and "(physical layer) cell identity of a serving cell", the "serving cell" may be understood as a serving cell associated with the geographical region rather than a serving cell associated with the radio resources. Further, in expressions of "contiguous cell" and "inter-cell interference", the "cell" may be understood as a cell associated with the geographical region rather than a cell associated with the radio resources.

3GPP LTE/LTE-A standards define DL physical channels corresponding to resource elements carrying information derived from a higher layer and DL physical signals corresponding to resource elements which are used by a physical layer but which do not carry information derived from the higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both an eNB and a UE. For example, a cell-specific RS (CRS), a UE-specific RS, a positioning RS (PRS), and channel state information RS (CSI-RS) may be defined as DL RSs. Meanwhile, the 3GPP LTE/LTE-A standards define UL physical channels corresponding to resource elements carrying information derived from the higher layer and UL physical signals corresponding to resource elements which are used by a physical layer but which do not carry information derived from the higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/PHICH/PDSCH/PUCCH/PUSCH/PRACH is referred to as PDCCH/PCFICH/PHICH/PDSCH/PUCCH/PUSCH/PRACH RE or PDCCH/PCFICH/PHICH/PDSCH/PUCCH/PUSCH/PRACH time-frequency resource, respectively. Therefore, in the present invention, PUCCH/PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

In the present invention, a CRS port, a UE-RS port, and a CSI-RS port refer to an antenna port configured to transmit a CRS, an antenna port configured to transmit a UE-RS, and an antenna port configured to transmit a CSI-RS, respectively. Antenna ports configured to transmit CRSs may be distinguished from each other by the locations of REs occupied by the CRSs according to CRS ports. Antenna ports configured to transmit UE-RSs may be distinguished from each other by the locations of REs occupied by the UE-RSs according to UE-RS ports. Antenna ports configured to transmit CSI-RSs may be distinguished from each other by the locations of REs occupied by the CSI-RSs according to CSI-RS ports. Therefore, the term CRS/UE-RS/CSI-RS ports may also be used to indicate patterns of REs occupied by the CRSs/UE-RSs/CSI-RSs in a predetermined resource region.

FIGS. 1(a) and 1(b) illustrate the structure of a radio frame used in a wireless communication system.

Specifically, FIG. 1(a) illustrates an exemplary structure of a radio frame which can be used in frequency division multiplexing (FDD) in 3GPP LTE/LTE-A and FIG. 1(b) illustrates an exemplary structure of a radio frame which can be used in time division multiplexing (TDD) in 3GPP LTE/LTE-A. The frame structure of FIG. 1(a) is referred to as frame structure type 1 (FS1) and the frame structure of FIG. 1(b) is referred to as frame structure type 2 (FS2).

Referring to FIG. 1, a 3GPP LTE/LTE-A radio frame is 10 ms (307,200 $T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since DL transmission and UL transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission. Table 2 shows an example of the special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

FIG. 2 illustrates the structure of a DL/UL slot structure in a wireless communication system. In particular, FIG. 2 illustrates the structure of a resource grid of a 3GPP LTE/LTE-A system. One resource grid is defined per antenna port.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} - 1$ in the time domain.

Meanwhile, one RB is mapped to one physical resource block (PRB) and one virtual resource block (VRB). A PRB is defined as $N^{DL}_{symb}$ (e.g. 7) consecutive OFDM or SC-FDM symbols in the time domain and $N^{RB}_{sc}$ (e.g. 12) consecutive subcarriers in the frequency domain. Accordingly, one PRB is configured with $N^{DL/UL}_{symb} * N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

FIGS. 3(a) and 3(b) illustrate a radio frame structure for transmission of a synchronization signal (SS). Specifically, FIGS. 3(a) and 3(b) illustrate a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

An SS will be described in more detail with reference to FIGS. 3(a) and 3(b). An SS is categorized into a PSS and an SSS. The PSS is used to acquire time-domain synchronization such as OFDM symbol synchronization or slot synchronization and/or frequency-domain synchronization. The SSS is used to acquire frame synchronization, a cell group ID, and/or CP configuration of a cell (i.e. information as to whether a normal CP is used or an extended CP is used). Referring to FIGS. 3(a) and 3(b), each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Specifically, a PSS is transmitted on the last OFDM symbol of the first slot of subframe 0 and on the last OFDM symbol of the first slot of subframe 5 and an SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined. That is, a single antenna port transmission scheme or a transmission scheme transparent to a UE (e.g. precoding vector switching (PVS), time switched transmit diversity (TSTD), or cyclic delay diversity (CDD)) may be used for transmit diversity of an SS An SS may represent a total of 504 unique physical layer cell IDs by a combination of 3 PSSs and 168 SSSs. In other words, the physical layer cell IDs are divided into 168 physical layer cell ID groups each including three unique IDs so that each physical layer cell ID is a part of only one physical layer cell ID group. Accordingly, a physical layer cell ID $N^{cell}_{ID} (=3N^{(1)}_{ID} + N^{(2)}_{ID})$ is uniquely defined as number $N^{(1)}_{ID}$ in the range of 0 to 167 indicating a physical layer cell ID group and number $N^{(2)}_{ID}$ from 0 to 2 indicating the physical layer ID in the physical layer cell ID group. A UE may be aware of one of three unique physical layer IDs by detecting the PSS and may be aware of one of 168 physical layer cell IDs associated with the physical layer ID by detecting the SSS. A length-63 Zadoff-Chu (ZC) sequence is defined in the frequency domain and is used as the PSS. As an example, the ZC sequence may be defined by the following equation.

$$d_u(n) = e^{-j\frac{\pi u n(n+1)}{N_{ZC}}} \quad \text{[Equation 1]}$$

where $N_{ZC}=63$ and a sequence element corresponding to a DC subcarrier, n=31, is punctured.

The PSS is mapped to 6 RBs (=72 subcarriers) near to a center frequency. Among the 72 subcarriers, 9 remaining subcarriers always carry a value of 0 and serve as elements facilitating filter design for performing synchronization. To define a total of three PSSs, u=24, 29, and 34 are used in Equation 1. Since u=24 and u=34 have a conjugate symmetry relationship, two correlations may be simultaneously performed. Here, conjugate symmetry indicates the relationship of the following Equation.

$$d_u(n)=(-1)^n(d_{N_{ZC}-u}(n))^*, \text{ when } N_{ZC} \text{ is even number}$$

$$d_u(d_{N_{ZC}-u}(n))^*, \text{ when } N_{ZC} \text{ is odd number} \quad \text{[Equation 2]}$$

A one-shot correlator for u=29 and u=34 may be implemented using the characteristics of conjugate symmetry. The entire amount of calculation can be reduced by about 33.3% as compared with the case without conjugate symmetry.

In more detail, a sequence d(n) used for a PSS is generated from a frequency-domain ZC sequence as follows.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases} \quad \text{[Equation 3]}$$

In Equation 3, the Zadoff-Chu root sequence index u is given by the following table.

TABLE 3

| $N^{(2)}_{ID}$ | Root index u |
|---|---|
| 0 | 25 |
| 1 | 29 |
| 2 | 34 |

Referring to FIGS. 3(a) and 3(b), upon detecting a PSS, a UE may discern that a corresponding subframe is subframe 0 or subframe 5 because the PSS is transmitted every 5 ms but the UE cannot discern whether the subframe is subframe 0 or subframe 5. Accordingly, the UE cannot recognize the boundary of a radio frame only by the PSS. Therefore, frame synchronization cannot be acquired only by the PSS. The UE detects the boundary of a radio frame by detecting an SSS which is transmitted twice in one radio frame with different sequences.

FIG. 4 illustrates an SSS generation scheme. Specifically, FIG. 4 illustrates a relationship of mapping of two sequences in the logical domain to sequences in a physical domain. A sequence used for the SSS is an interleaved concatenation of two length-31 m-sequences and the concatenated sequence is scrambled by a scrambling sequence given by a PSS. Here, an m-sequence is a type of a pseudo noise (PN) sequence.

Referring to FIG. 4, if two m-sequences used for generating an SSS code are S1 and S2, then two different PSS-based sequences S1 and S2 are scrambled into to the SSS. In this case, S1 and S2 are scrambled by different sequences. A PSS-based scrambling code may be obtained by cyclically shifting an m-sequence generated from a polynomial of $x^5+x^3+1$ and 6 sequences are generated by cyclic shift of the m-sequence according to an index of a PSS. Next, S2 is scrambled by an S1-based scrambling code. The S1-based scrambling code may be obtained by cyclically shifting an m-sequence generated from a polynomial of $x^5++x^4+x^2+x^1+1$ and 8 sequences are generated by cyclic shift of the m-sequence according to an index of S1. The SSS code is swapped every 5 ms, whereas the PSS-based scrambling code is not swapped. For example, assuming that an SSS of subframe 0 carries a cell group ID by a combination of (S1, S2), an SSS of subframe 5 carries a sequence swapped as (S2, S1). Hence, a boundary of a radio frame of 10 ms can be discerned. In this case, the used SSS code is generated from a polynomial of $x^5+x^2+1$ and a total of 31 codes may be generated by different cyclic shifts of an m-sequence of length-31.

A combination of two length-31 m-sequences for defining the SSS is different in subframe 0 and subframe 5 and a total of 168 cell group IDs are expressed by a combination of the two length-31 m-sequences. The m-sequences used as sequences of the SSS have a robust property in a frequency selective environment. In addition, since the m-sequences can be transformed by high-speed m-sequence transform using fast Hadamard transform, if the m-sequences are used as the SSS, the amount of calculation necessary for a UE to interpret the SSS can be reduced. Since the SSS is configured by two short codes, the amount of calculation of the UE can be reduced.

Generation of the SSS will now be described in more detail. A sequence d(0), . . . , d(61) used for the SSS is an interleaved concatenation of two length-31 binary sequences. The concatenated sequence is scrambled by a sequence given by the PSS.

A combination of two length-31 sequences for defining the PSS becomes different in subframe 0 and subframe 5 according to the following.

$$d(2n) = \begin{cases} s_0^{(m_0)}(n)c_0(n) & \text{in subframe 0} \\ s_1^{(m_1)}(n)c_0(n) & \text{in subframe 5} \end{cases} \quad \text{[Equation 4]}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

In Equation 4, $0 \leq n \leq 30$. The indices $m_0$ and $m_1$ are derived from the physical-layer cell-identity group $N^1_{ID}$ according to the following.

$$m_0 = m' \bmod 31 \quad \text{[Equation 5]}$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor, q' = \lfloor N^{(1)}_{ID}/30 \rfloor$$

The output of Equation 5 is listed in Table 4 following Equation 11.

The two sequences $s^{(m0)}_0(n)$ and $s^{(m1)}_1(n)$ are defined as two different cyclic shifts of the m-sequence s(n).

$$s_0^{(m_0)}(n)=s((n+m_0) \bmod 31)$$

$$s_1^{(m_1)}(n)=s((n+m_1) \bmod 31) \quad \text{[Equation 6]}$$

In Equation 6, s(i)=1−2x(i), $0 \leq i \leq 30$, is defined by the following equation with initial conditions x(0)=0, x(1)=0, x(2), x(3)=0, x(4)=1.

$$x(\bar{i}+5)=(x(\bar{i}3)+x(\bar{i})) \bmod 2, 0 \leq \bar{i} \leq 25 \quad \text{[Equation 7]}$$

The two scrambling sequences $c_0(n)$ and $c_1(n)$ depend on the PSS and are defined by two different cyclic shifts of the m-sequence $c(n)$ according to the following equation.

$$c_0(n)=c((n+N_{ID}^{(2)}) \bmod 31)$$

$$c_1(n)=c((n+N_{ID}^{(2)}+3) \bmod 31) \quad \text{[Equation 8]}$$

In Equation 8, $N_{ID}^{(2)} \in \{0,1,2\}$ is the physical-layer identity within the physical-layer cell identity group $N_{ID}^{(1)}$ and $c(i)=1-2x(i)$ $(0 \leq i \leq 30)$, is defined by the following equation with initial conditions $x(0)=0$, $x(1)=0$, $x(2)$, $x(3)=0$, $x(4)=1$.

$$x(\bar{i}+5)=(x(\bar{i}+3)+x(\bar{i})) \bmod 2, \ 0 \leq \bar{i} \leq 25 \quad \text{[Equation 9]}$$

The scrambling sequences $z_1^{(m0)}(n)$ and $z_1^{(m1)}(n)$ are defined by a cyclic shift of the m-sequence $z(n)$ according to the following equation.

$$z_1^{(m0)}(n)=z((n+(m_0 \bmod 8)) \bmod 31)$$

$$z_1^{(m1)}(n)=z((n+(m_1 \bmod 8)) \bmod 31) \quad \text{[Equation 10]}$$

In Equation 10, $m_0$ and $m_1$ are obtained from Table 4 following Equation 11 and $z(i)=1-2x(i)$, $0 \leq i \leq 30$, is defined by the following equation with initial conditions $x(0)=0$, $x(1)=0$, $x(2)$, $x(3)=0$, $x(4)=1$.

$$x(\bar{i}+5)=(x(\bar{i}+4)+x(\bar{i}+2)+x(\bar{i}+1)+x(\bar{i})) \bmod 2, \ 0 \leq \bar{i} \leq 25 \quad \text{[Equation 11]}$$

TABLE 4

| $N_{ID}^{(1)}$ | $m_0$ | $m_1$ |
|---|---|---|
| 0 | 0 | 1 |
| 1 | 1 | 2 |
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |

TABLE 4-continued

| $N_{ID}^{(1)}$ | $m_0$ | $m_1$ |
|---|---|---|
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

A UE, which has demodulated a DL signal by performing a cell search procedure using an SSS and determined time and frequency parameters necessary for transmitting a UL signal at an accurate time, can communicate with an eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB1), SIB Type 2 (SIB2), and SIB3 to SIB8 according to included parameters. The MIB includes most frequency transmitted parameters which are essential for initial access of the UE to a network of the eNB. SIB1 includes parameters needed to determine if a specific cell is suitable for cell selection, as well as information about time-domain scheduling of the other SIBs.

The UE may receive the MIB through a broadcast channel (e.g. a PBCH). The MIB includes DL bandwidth (BW), PHICH configuration, and a system frame number SFN. Accordingly, the UE can be explicitly aware of information about the DL BW, SFN, and PHICH configuration by receiving the PBCH. Meanwhile, information which can be implicitly recognized by the UE through reception of the PBCH is the number of transmit antenna ports of the eNB. Information about the number of transmit antennas of the eNB is implicitly signaled by masking (e.g. XOR operation) a sequence corresponding to the number of transmit antennas to a 16-bit cyclic redundancy check (CRC) used for error detection of the PBCH.

The PBCH is mapped to four subframes during 40 ms. The time of 40 ms is blind detected and explicit signaling about 40 ms is not separately present. In the time domain, the PBCH is transmitted on OFDM symbols 0 to 3 of slot 1 in subframe 0 (the second slot of subframe 0) of a radio frame.

In the frequency domain, a PSS/SSS and a PBCH are transmitted only in a total of 6 RBs, i.e. a total of 72 subcarriers, irrespective of actual system BW, wherein 3 RBs are in the left and the other 3 RBs are in the right centering on a DC subcarrier on corresponding OFDM symbols. Therefore, the UE is configured to detect or decode the SS and the PBCH irrespective of DL BW configured for the UE.

After initial cell search, a UE which has accessed a network of an eNB may acquire more detailed system information by receiving a PDCCH and a PDSCH according to information carried on the PDCCH. The UE which has performed the above-described procedure may perform reception of a PDCCH/PDSCH and transmission of a PUSCH/PUCCH as a normal UL/DL signal transmission procedure.

Figure 5:
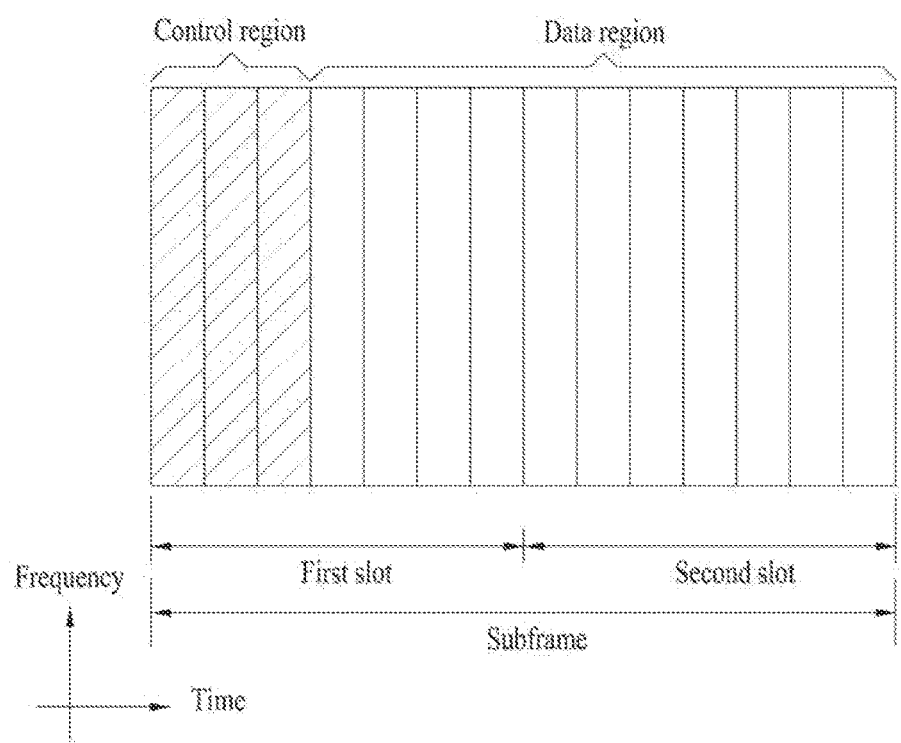
FIG. 5 illustrates the structure of a DL subframe used in a wireless communication system.

FIG. 5 illustrates the structure of a DL subframe used in a wireless communication system.

A DL subframe is divided into a control region and a data region in the time domain. Referring to FIG. 5, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region. Examples of a DL control channel used in 3GPP LTE include a physical control format indicator channel (PCFICH), a physical downlink control channel (PDCCH), a physical hybrid ARQ indicator channel (PHICH), etc. The PCFICH is transmitted in the first OFDM symbol of a subframe and carries information about the number of OFDM symbols available for transmission of a control channel within a subframe. The PHICH carries a HARQ (Hybrid Automatic Repeat Request) ACK/NACK (acknowledgment/negative-acknowledgment) signal as a response to UL transmission.

The control information transmitted through the PDCCH will be referred to as downlink control information (DCI). The DCI includes resource allocation information for a UE or UE group and other control information. Transmit format and resource allocation information of a downlink shared channel (DL-SCH) are referred to as DL scheduling information or DL grant. Transmit format and resource allocation information of an uplink shared channel (UL-SCH) are referred to as UL scheduling information or UL grant. The size and usage of the DCI carried by one PDCCH are varied depending on DCI formats. The size of the DCI may be varied depending on a coding rate. In the current 3GPP LTE system, various formats such as formats 0 and 4 for UL and formats 1, 1A, 1B, 1C, 1D, 2, 2A, 2B, 3 and 3A for DL are defined. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), precoding matrix indicator (PMI) information is transmitted to the UE as the DCI. Table 5 illustrates an example of the DCI format.

TABLE 5

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at the bit level.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH). The number of DCI formats and DCI bits is determined in accordance with the number of CCEs. CCEs are numbered and used consecutively. In order to simplify a decoding process, the PDCCH having a format that includes n CCEs may only start on a CCE having a CCE number corresponding to a multiple of n. The number of CCEs used for transmission of a specific PDCCH is determined by the eNB in accordance with channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

In a 3GPP LTE/LTE-A system, a set of CCEs on which a PDCCH can be located for each UE is defined. A CCE set in which the UE can detect a PDCCH thereof is referred to as a PDCCH search space or simply as a search space (SS). An individual resource on which the PDCCH can be transmitted in the SS is called a PDCCH candidate. A set of PDCCH candidates that the UE is to monitor is defined as the SS. SSs for respective PDCCH formats may have different sizes and a dedicated SS and a common SS are defined. The dedicated SS is a UE-specific SS and is configured for each individual UE. The common SS is configured for a plurality of UEs. The following table shows aggregation levels for defining SSs.

TABLE 6

| Type | Search space $S_k^{(L)}$ | | Number of PDCCH candidates $M^{(L)}$ |
| --- | --- | --- | --- |
| | Aggregation level L | Size [in CCEs] | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

For the common search spaces, $Y_k$ is set to 0 for aggregation levels L=4 and L=8. For the UE SS $S^{(L)}_k$ at aggregation level L, the variable $Y_k$ is defined by the following equation.

$$Y_k = (A \cdot Y_{k-1}) \bmod D \quad \text{[Equation 12]}$$

In Equation 12, $Y_{-1} = n_{RNTI}$, A=39827, D=65537 and $k = \lfloor n_s/2 \rfloor$, $n_s$ is the slot number within a radio frame. SI-RNTI, C-RNTI, P-RNTI, RA-RNTI, etc. may be used as an RNTI for $n_{RNTI}$.

For each serving cell on which a PDCCH is monitored, the CCEs corresponding to PDCCH candidate m of the search space $S^{(L)}_k$ are given by the following equation.

$$L\{(Y_k + m') \bmod \lfloor N_{CCE,k}/L \rfloor\} + i \quad \text{[Equation 13]}$$

In Equation 13, Yk may be defined by Equation 12, i=0, ..., L−1. For the common search space, m'=m. For the UE SS, for the serving cell on which the PDCCH is monitored, if a carrier indicator field is configured for monitoring a UE, for example, if the UE is informed that the carrier indicator field is present on the PDCCH by a higher layer, then m'=m+M(L)·nCI where nCI is a carrier indicator field value. The carrier indicator field value is the same as a serving cell index (ServCellIndex) of a corresponding serving cell. The serving cell index is a short ID used to identify a serving cell and, for example, any integer from 0 to 'maximum number of carrier frequencies which can be configured for the UE at a time minus 1' may be allocated to one serving cell as the serving cell index. Therefore, the serving cell index may be a logical index used to identify a specific serving cell among cells allocated to the UE rather than a physical index used to identify a specific carrier frequency among all carrier frequencies. If the UE is not configured with carrier indicator field (CIF) then m'=m, where m'=0, . . . , M(L)−1. M(L) is the number of PDCCH candidates to monitor in the given search space. For reference, the CIF is included in DCI and, in carrier aggregation, the CIF is used to indicate the cell for which the DCI carries scheduling information. An eNB may inform the UE whether the DCI received by the UE may include the CIF via a higher layer signal such that the UE may be configured with the CIF by a higher layer. Carrier aggregation is described in more detail with reference to FIGS. 9(a), 9(b), and FIG. 10.

The eNB transmits an actual PDCCH (DCI) on a PDCCH candidate in a search space and the UE monitors the search space to detect the PDCCH (DCI). Here, monitoring implies attempting to decode each PDCCH in the corresponding SS according to all monitored DCI formats. The UE may detect a PDCCH thereof by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected and this process is referred to as blind detection (or blind decoding (BD)).

For example, it is assumed that a specific PDCCH is CRC-masked with a radio network temporary identity (RNTI) 'A' and information about data transmitted using a radio resource 'B' (e.g. frequency location) and using transport format information 'C' (e.g. transmission block size, modulation scheme, coding information, etc.) is transmitted in a specific DL subframe. Then, the UE monitors the PDCCH using RNTI information thereof. The UE having the RNTI 'A' receives the PDCCH and receives the PDSCH indicated by 'B' and 'C' through information of the received PDCCH.

Generally, a DCI format which can be used for the UE differs according to a transmission mode (TM) configured for the UE. In other words, for the UE configured for a specific transmission mode, not all DCI formats but some DCI format(s) corresponding to the specific transmission mode can be used. For example, the UE is semi-statically configured by higher layers so as to receive PDSCH data transmission, which was signaled through a PDCCH, according to one of transmission modes 1 to 9. To maintain operation load of the UE according to blind decoding attempt at a predetermined level or less, not all DCI formats are always simultaneously searched by the UE. Table 7 illustrates a transmission mode for configuring multi-antenna technology and a DCI format where the UE performs blind decoding in accordance with the corresponding transmission mode.

TABLE 7

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, port 0 |
|  | DCI format 1 | UE specific by C-RNTI | Single-antenna port, port 0 |
| Mode 2 | DCI format 1A | Common and UE specific by C-RNTI | Transmit diversity |
|  | DCI format 1 | UE specific by C-RNTI | Transmit diversity |
| Mode 3 | DCI format 1A | Common and UE specific by C-RNTI | Transmit diversity |
|  | DCI format 2A | UE specific by C-RNTI | Large delay CDD or Transmit diversity |
| Mode 4 | DCI format 1A | Common and UE specific by C-RNTI | Transmit diversity |
|  | DCI format 2 | UE specific by C-RNTI | Closed-loop spatial multiplexing or Transmit diversity |
| Mode 5 | DCI format 1A | Common and UE specific by C-RNTI | Transmit diversity |
|  | DCI format 1D | UE specific by C-RNTI | Multi-user MIMO |
| Mode 6 | DCI format 1A | Common and UE specific by C-RNTI | Transmit diversity |
|  | DCI format 1B | UE specific by C-RNTI | Closed-loop spatial multiplexing using a single transmission layer |
| Mode 7 | DCI format 1A | Common and UE specific by C-RNTI | If the number of PBCH antenna ports is one, Single-antenna port, port 0 is used, otherwise Transmit diversity |
|  | DCI format 1 | UE specific by C-RNTI | Single-antenna port, port 5 |
| Mode 8 | DCI format 1A | Common and UE specific by C-RNTI | If the number of PBCH antenna ports is one, Single-antenna port, port 0 is used, otherwise Transmit diversity |
|  | DCI format 2B | UE specific by C-RNTI | Dual layer transmission, port 7 and 8 or single-antenna port, port 7 or 8 |
| Mode 9 | DCI format 1A | Common and UE specific by C-RNTI | Non-MBSFN subframe: If the number of PBCH antenna ports is one, Single-antenna port, port 0 is used, otherwise Transmit diversity. MBSFN subframe: Single-antenna port, port 7 |
|  | DCI format 2C | UE specific by C-RNTI | Up to 8 layer transmission, ports 7-14 |

Transmission modes 1 to 9 are listed in Table 7 but transmission modes other than the transmission modes listed in Table 7 may be defined.

In particular, Table 7 illustrates a relation between PDSCH and PDCCH configured by C-RNTI. The UE configured to decode the PDCCH with CRC scrambled in C-RNTI by an upper layer decodes the PDCCH and also decodes the corresponding PDSCH in accordance with each combination defined in Table 7. For example, if the UE is configured in transmission mode 1 by upper layer signaling, the UE acquires either DCI of DCI format 1A or DCI of DCI format 1 by respectively decoding the PDCCH through the DCI format 1A and 1.

In order for the receiving device 20 to restore a signal transmitted by the transmitting device 10, an RS for estimating a channel between the receiving device and the transmitting device is needed. RSs may be categorized into RSs for demodulation and RSs for channel measurement. CRSs defined in the 3GPP LTE system can be used for both demodulation and channel measurement. A dedicated RS (DRS) is known only to a specific UE and the CRS is known to all UEs. Among RSs defined in the 3GPP LTE system, the cell-specific RS may be considered a sort of the common RS. For reference, since demodulation is a part of a decoding process, the term demodulation in embodiments of the present invention is used interchangeably with decoding.

Figure 6:
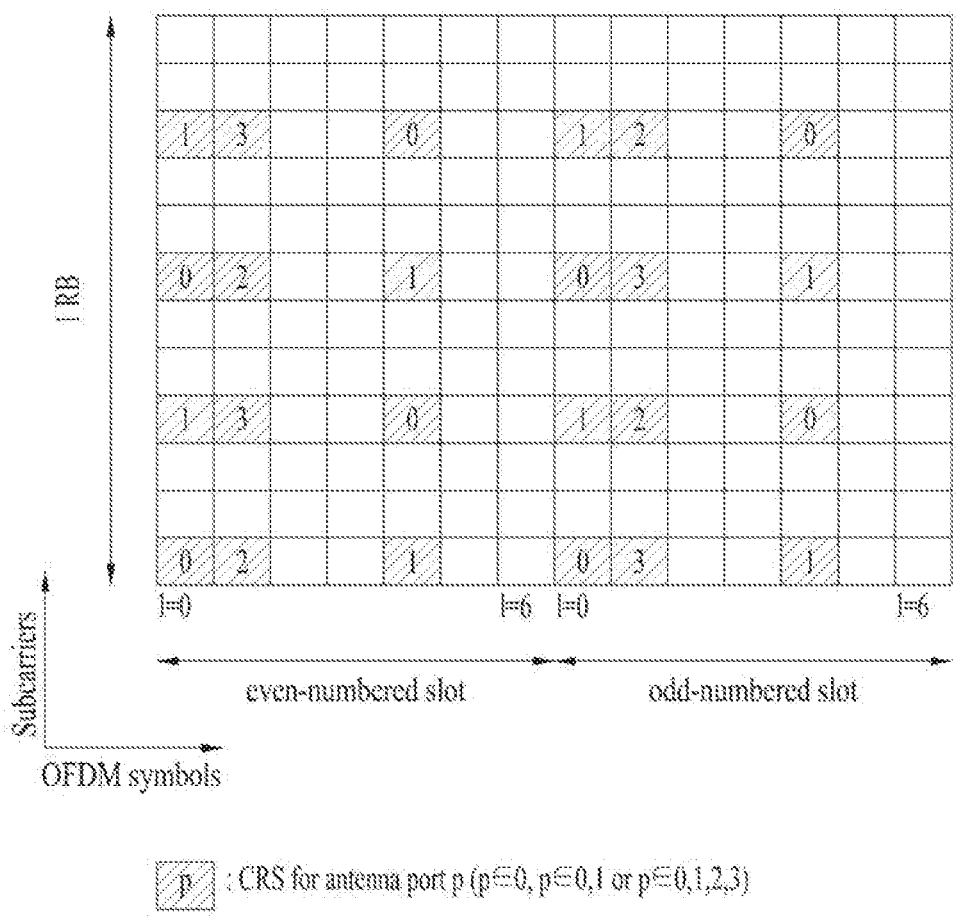
FIG. 6 illustrates configuration of cell specific common reference signals (CRSs).

FIG. 6 illustrates configuration of cell specific reference signals (CRSs). Especially, FIG. 6 illustrates configuration of CRSs for a 3GPP LTE system supporting a maximum of four antennas.

In an existing 3GPP system, since CRSs are used for both demodulation and measurement, the CRSs are transmitted in all DL subframes in a cell supporting PDSCH transmission and are transmitted through all antenna ports configured at an eNB. A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE. However, when the PDSCH is transmitted based on the CRSs, since the eNB should transmit the CRSs in all RBs, unnecessary RS overhead occurs.

To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS. The UE-RS is configured to be transmitted only in RB(s) to which the PDSCH is mapped in a subframe in which the PDSCH is scheduled, unlike the CRS which is configured to be transmitted in every subframe regardless of whether the PDSCH is present. In addition, the UE-RS is transmitted only over antenna port(s) corresponding respectively to layer(s) of the PDSCH, unlike the CRS which is transmitted over all antenna port(s) irrespective of the number of layers of the PDSCH. Therefore, the UE-RS can reduce RS overhead relative to the CRS. The CSI-RS is a DL RS introduced for channel measurement. In the 3GPP LTE-A system, a plurality of CSI-RS configurations is defined for CSI-RS transmission. In subframes in which CSI-RS transmission is configured, CSI-RS sequence $r_{l,n_s}(m)$ is mapped to complex modulation symbols $a_{k,l}^{(p)}$ used as RSs on antenna port p according to the following equation.

$$a_{k,l}^{(p)} = w_{l''} \cdot r_{l,n_s}(m') \quad \text{[Equation 14]}$$

In Equation 14, $W_{l''}$, k, l are given by the following equation.

[Equation 15]

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations 0-19, normal cyclic prefix} \\ 2l'' & \text{CSI reference signal configurations 20-31, normal cyclic prefix} \\ l'' & \text{CSI reference signal configurations 0-27, extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where (k', l') and necessary conditions on $n_s$ are given by Table 8 and Table 9 in a normal CP and an extended CP, respectively. That is, CSI-RS configurations of Table 8 and Table 9 denote locations of REs occupied by a CSI-RS of each antenna port in an RB pair.

TABLE 8

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FS1 and FS2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |

TABLE 8-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| | 19 | (2, 5) | 1 | | | |
| FS2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 9

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| FS1 and FS2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

FIG. 7 illustrates CSI-RS configurations. Particularly, FIG. 7(a) illustrates 20 CSI-RS configurations 0 to 19 available for CSI-RS transmission through two CSI-RS ports among the CSI-RS configurations of Table 8, FIG. 7(b) illustrates 10 available CSI-RS configurations 0 to 9 through four CSI-RS ports among the CSI-RS configurations of Table 8, and FIG. 7(c) illustrates 5 available CSI-RS configurations 0 to 4 through 8 CSI-RS ports among the CSI-RS configurations of Table 8. The CSI-RS ports refer to antenna ports configured for CSI-RS transmission. For example, referring to Equation 15, antenna ports 15 to 22 correspond to the CSI-RS ports. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 8 or Table 9 but also with subframes in which CSI-RSs are configured. That is, if subframes for CSI-RS transmission differ even when CSI-RS configuration numbers are the same in Table 8 or Table 9, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations. Hereinafter, in order to distinguish between a CSI-RS configuration to which a CSI-RS configuration number of Table 8 or Table 9 is assigned and a CSI-RS configuration varying according to a CSI-RS configuration number of Table 8 or Table 9, the number of CSI-RS ports, and/or a CSI-RS configured subframe, the CSI-RS configuration of the latter will be referred to as a CSI-RS resource configuration.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows CSI-RS subframe configuration $I_{CSI-RS}$ according to $T_{CSI-RS}$ and $\Delta_{CSI-RS}$.

TABLE 10

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying the following equation are subframes including CSI-RSs.

$(10n_f+\lfloor n_s/2 \rfloor - \Delta_{CSI-RS}) \bmod T_{CSI-RS} = 0$     [Equation 16]

$P_c$ is the ratio of PDSCH EPRE to CSI-RS EPRE, assumed by the UE when the UE derives CSI for CSI feedback. EPRE indicates energy per RE. CSI-RS EPRE indicates energy per RE occupied by the CSI-RS and PDSCH EPRE denotes energy per RE occupied by a PDSCH.

The zero-power CSI-RS configuration list denotes CSI-RS pattern(s) in which the UE should assume zero transmission power. For example, since the eNB will transmit signals at zero transmission power on REs included in CSI-RS configurations indicated as zero transmission power in the zero power CSI-RS configuration list, the UE may assume signals received on the corresponding REs as interference or decode DL signals except for the signals received on the corresponding REs. Referring to Table 8 and Table 9, the zero power CSI-RS configuration list may be a 16-bit bitmap corresponding one by one to 16 CSI-RS patterns for four antenna ports. In the 16-bit bitmap, the most significant bit corresponding to a CSI-RS configuration of the lowest CSI-RS configuration number (also called a CSI-RS configuration index) and subsequent bits correspond to CSI-RS patterns in an ascending order. The UE assumes zero transmission power with respect to REs of a CSI-RS pattern corresponding to bit(s) set to '1' in the 16-bit zero power CSI-RS bitmap configured by a higher layer. Hereinafter, a CSI-RS pattern in which the UE assumes zero transmission power will be referred to as a zero power CSI-RS pattern.

A zero power CSI-RS subframe configuration is information for specifying subframes including the zero power CSI-RS pattern. Like the CSI-RS subframe configuration, a subframe in which the zero power CSI-RS occurs may be configured for the UE using $I_{CSI-RS}$ according to Table 10. The UE may assume that subframes satisfying Equation 16 include the zero power CSI-RS pattern. $I_{CSI-RS}$ may be separately configured with respect to a CSI-RA pattern in which the UE should assume non-zero transmission power and a zero power CSI-RS pattern in which the UE should assume zero transmission power, on REs.

The UE configured for a transmission mode (e.g. transmission mode 9 or other newly defined transmission modes) according to the 3GPP LTE-A system may perform channel measurement using a CSI-RS and demodulate or decode a PDSCH using a UE-RS.

FIG. 8 illustrates the structure of a UL subframe used in a wireless communication system.

Referring to FIG. 8, a UL subframe may be divided into a data region and a control region in the frequency domain. One or several PUCCHs may be allocated to the control region to deliver UCI. One or several PUSCHs may be allocated to the data region of the UE subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g. a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. HARQ-ACK is used interchangeably with HARQ ACK/NACK and ACK/NACK.

Channel state information (CSI): CSI is feedback information for a DL channel. CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that the UE can receive through the same time-frequency resource. The PMI is a value reflecting a space characteristic of a channel, indicating an index of a preferred precoding matrix for DL signal transmission based on a metric such as an SINR. The CQI is a value of channel strength, indicating a received SINR that can be obtained by the UE generally when the eNB uses the PMI.

Figures 9A, 9B:
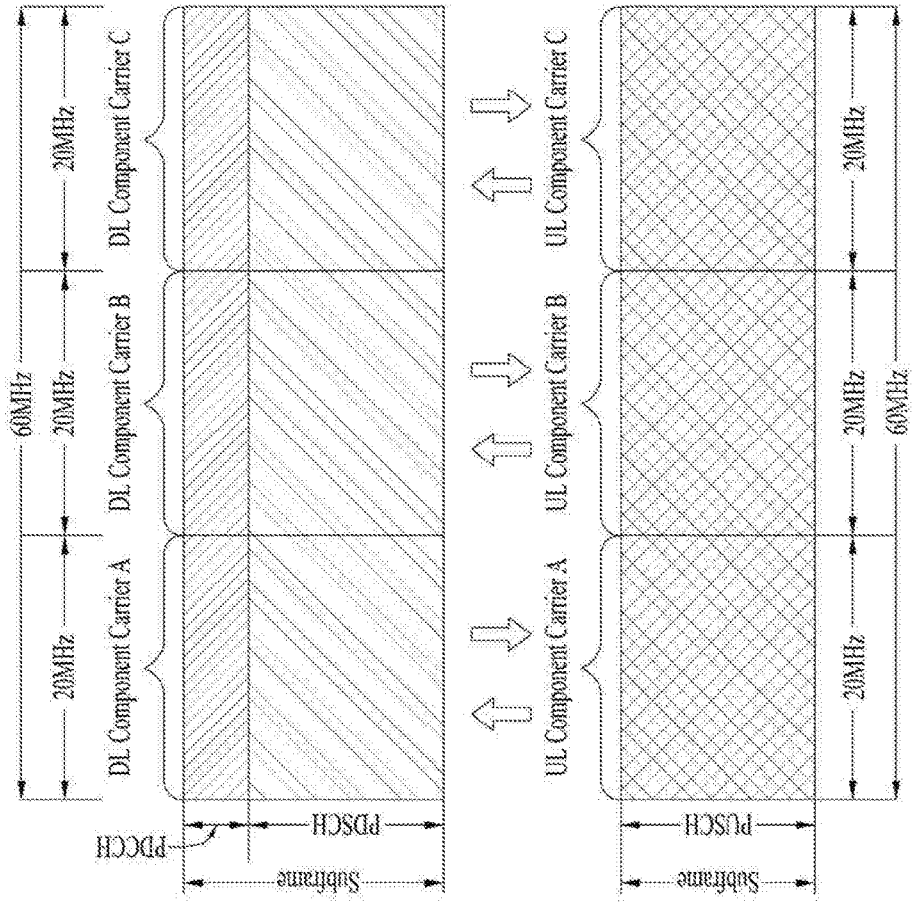
FIGS. 9(a) and 9(b) are diagrams for explaining single-carrier communication and multi-carrier communication.

FIGS. 9(a) and 9(b) are diagrams for explaining single-carrier communication and multi-carrier communication. Specially, FIG. 9(a) illustrates a subframe structure of a single carrier and FIG. 9(b) illustrates a subframe structure of multiple carriers.

Referring to FIG. 9(a), a general wireless communication system transmits/receives data through one downlink (DL) band and through one uplink (UL) band corresponding to the DL band (in the case of frequency division duplex (FDD) mode), or divides a prescribed radio frame into a UL time unit and a DL time unit in the time domain and transmits/receives data through the UL/DL time unit (in the case of time division duplex (TDD) mode). Recently, to use a wider frequency band in recent wireless communication systems, introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Each of carriers aggregated by carrier aggregation will be referred to as a component carrier (CC). Referring to FIG. 9(b), three 20 MHz CCs in each of UL and DL are aggregated to support a BW of 60 MHz. The CCs may be contiguous or non-contiguous in the frequency domain. Although FIG. 9(b) illustrates that a BW of UL CC and a BW of DL CC are the same and are symmetrical, a BW of each component carrier may be defined independently. In addition, asymmetric carrier aggregation where the number of UL CCs is different from the number of DL CCs may be configured. A DL/UL CC for a specific UE may be referred to as a serving UL/DL CC configured at the specific UE.

In the meantime, the 3GPP LTE-A system uses a concept of cell to manage radio resources. The "cell" associated with the radio resources is defined by combination of DL resources and UL resources, that is, combination of DL CC and UL CC. The cell may be configured by DL resources only, or may be configured by DL resources and UL resources. If carrier aggregation is supported, linkage between a carrier frequency of the DL resources (or DL CC) and a carrier frequency of the UL resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on DL will be referred to as a DL primary CC (DL PCC), and the carrier corresponding to the Pcell on UL will be referred to as a UL primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the DL will be referred to as DL secondary CC (DL SCC), and the carrier corresponding to the Scell on the UL will be referred to as UL secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured in the UE or deactivate some of the serving cells for communication with the UE. The eNB may change the activated/deactivated cell, and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

Figure 10:
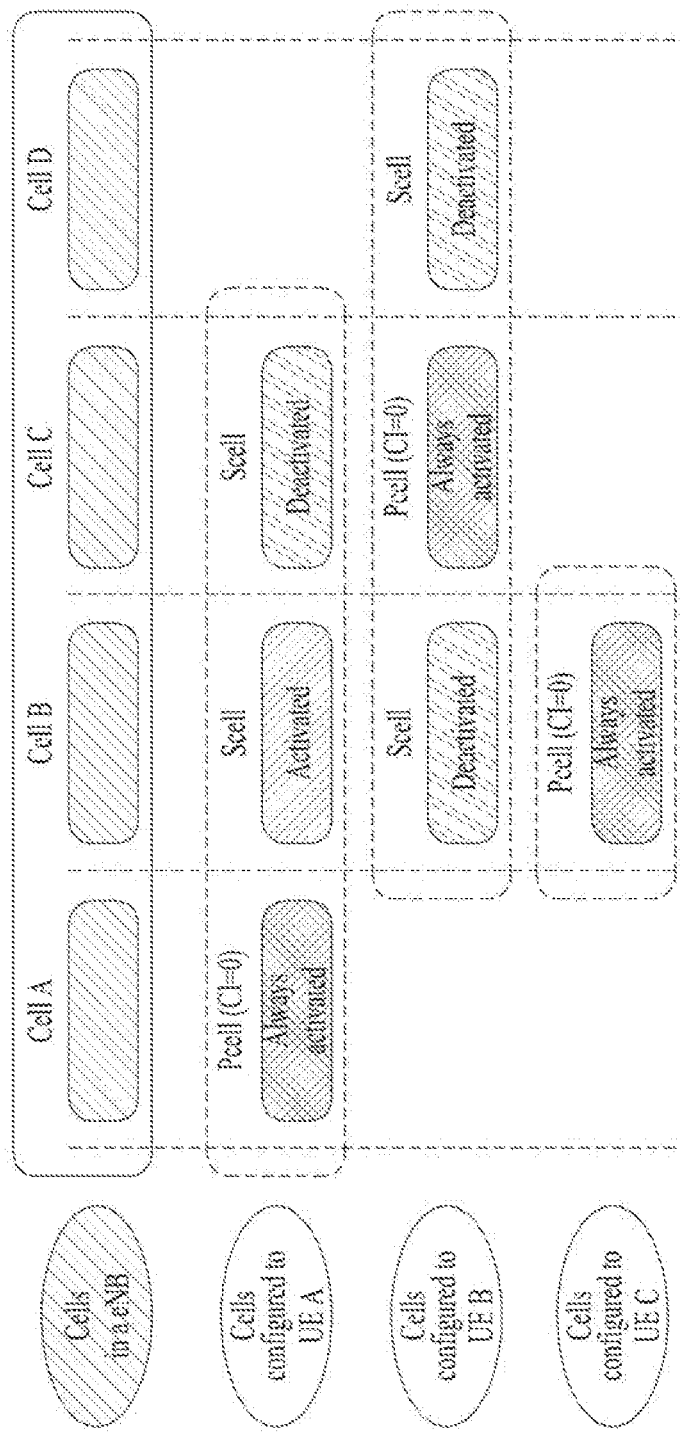
FIG. 10 illustrates the state of cells in a system supporting carrier aggregation.

FIG. 10 illustrates the state of cells in a system supporting carrier aggregation.

In FIG. 10, a configured cell refers to a cell in which carrier aggregation is performed for a UE based on measurement report from another eNB or UE among cells of an eNB and is configured per UE. The cell configured for the UE may be a serving cell in terms of the UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell. For reference, in FIG. 10, CI denotes the above-described serving cell index and CI=0 is applied to Pcell.

In the 3GPP LTE/LTE-A system, there are two transmission schemes: open-loop MIMO operated without feedback of channel information and closed-loop MIMO using feedback of the channel information. In closed-loop MIMO, each of a transmitter and a receiver performs beamforming based on the channel information, i.e. CSI, to obtain a multiplexing gain of MIMO antennas. To report the CSI, time and frequency resources which can be used by the UE are controlled by then eNB. For example, the eNB commands the UE to feedback DL CSI by allocating a PUCCH or a PUSCH to the UE in order to obtain the DL CSI.

A CSI report is periodically or aperiodically configured. A periodic CSI report is transmitted by the UE on the PUCCH except for a special case (e.g. when the UE is not configured for simultaneous PUSCH and PUCCH transmission and when a PUCCH transmission timing collides with a subframe with PUSCH allocation). In the CSI, since an RI is dominantly determined by long-term fading, the RI is typically fed back to the UE from the eNB at a cycle longer than that of a PMI and CQI. In contrast, an aperiodic CSI report is transmitted on the PUSCH. The aperiodic CSI report is triggered by a CSI request field included in the DCI (e.g. DCI of DCI format 0 or 4) for scheduling of UL data (hereinafter, UL DCI format). The UE, which has decoded the UL DCI format or a random access response grant for a specific serving cell (hereinafter, serving cell c) in subframe n, performs aperiodic CSI reporting using the PUSCH in subframe n+k in serving cell c when the CSI request field is set to trigger the CSI report and when the CSI request field is not reserved. The PUSCH corresponds to a PUSCH transmitted in subframe n+k according to the UL DCI format decoded in subframe n. In the case of FDD, k=4. In the case of TDD, k is given by the following table.

TABLE 11

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | | 4 | | | | | | | 4 | 4 |
| 4 | | | | | | | | | 4 | 4 |
| 5 | | | | | | | | | 4 | |
| 6 | | 7 | 7 | | | | 7 | 7 | | 5 |

For example, when a UE for which a TDD UL/DL configuration is 6 detects a UL DCI format for serving cell c in subframe 9, the UE performs aperiodic CSI reporting triggered by a CSI request field in the detected UL DCI format on the PUSCH of serving cell c in subframe 9+5, i.e. in subframe 4 of a radio frame following a radio frame including subframe 9 in which the UL DCI format is detected.

Currently, the CSI request field is 1 bit or 2 bits in length. If the CSI request field is 1 bit, the CSI request field set to '1' triggers the aperiodic CSI report for serving cell c. If the CSI request field is 2 bits, the aperiodic CSI report corresponding to the following table is triggered. That is, the following table shows the CSI request field with the UL DCI format.

TABLE 12

| Value of CSI request field | Description |
|---|---|
| '00' | No aperiodic CSI report is triggered |
| '01' | Aperiodic CSI report is triggered for serving cell c |
| '10' | Aperiodic CSI report is triggered for a $1^{st}$ set of serving cells configured by higher layers |
| '11' | Aperiodic CSI report is triggered for a $2^{nd}$ set of serving cells configured by higher layers |

Recently, application of CoMP technology to the LTE/LTE-A system has been considered. CoMP technology involves a plurality of nodes. If CoMP technology is introduced to the LTE/LTE-A system, a new transmission mode may be defined in association with CoMP technology. There are various CSI-RS configurations received by the UE according to a scheme in which the nodes participate in communication. Due to this, whereas a maximum of one CSI-RS configuration or one CSI-RS resource configuration in which the UE should assume non zero transmission power for a CSI-RS can be used in a conventional LTE system, a maximum number of CSI resource configurations available for the UE is one or more in the case of a CoMP configured UE, i.e. a UE configured in a CoMP mode. When the UE is configured in a mode in which one or more CSI-RS resource configurations can be configured, that is, when the UE is configured in a CoMP mode, the UE may receive a higher layer signal including information about one or more CSI-RS resource configurations. If carrier aggregation (hereinafter, CA) as well as CoMP is configured for the UE, one or more CSI-RS resource configurations per serving cell can be used.

Meanwhile, in a conventional LTE/LTE-A system, the UE has transmitted/received signals to/from one node in a specific serving cell. In more detail, in the conventional LTE/LTE-A system, since only one radio link is present in one serving cell, only one CSI could be calculated by the UE with respect to one serving cell. However, in CoMP involving a plurality of nodes, DL channel states may differ per node or per combination of nodes. Since CSI-RS resource configurations may differ according to a node or combination of nodes, CSI is associated with a CSI-RS resource. In addition, channel states may vary with an interference environment between nodes participating in CoMP. In other words, if CoMP is configured, a channel state per node or per combination of nodes may be measured by the UE and, since CSI may be present in each interference environment, a maximum number of CSIs which can be calculated per serving cell of the UE may be an integer greater than one. In order for the UE to derive the CSI, which CSI should be reported by the UE and how the UE should reports the CSI may be configured by higher layers. If CoMP is configured, a plurality of CSIs as well as one CSI can be calculated by the UE. Accordingly, when a CoMP mode is configured for the UE, a CSI report for one or more CSIs per serving cell of the UE may be configured for periodic or aperiodic CSI reporting.

As mentioned previously, in CoMP, the CSI is associated with a CSI-RS resource used for channel measurement and a resource used for interference measurement (hereinafter, an interference measurement (IM) resource). Hereinafter, association of a CSI-RS resource for signal measurement and an IM resource for interference measurement will be referred to as a CSI process. That is, the CSI process may be associated with a CSI-RS resource and a IM resource (IMR).

It is preferable that an eNB to which a UE is connected or an eNB for managing a node of a cell in which the UE is located (hereinafter, a serving eNB) transmit no signals on an IMR. Accordingly, the IMR may be configured for the UE by the same scheme as in a zero-power CSI-RS. For example, the eNB may inform the UE of REs used by the UE for interference measurement using the 16-bit bitmap indicating the above-described zero power CSI-RS pattern and using the CSI-RS subframe configuration. In this way, if the IMR is explicitly configured for the UE, the UE measures interference on the IMR and calculates CSI under the assumption that the measured interference is interference on a CSI reference resource which is reference for CSI measurement. More specifically, the UE may perform channel measurement based on a CSI-RS or a CRS, perform interference measurement based on the IMR, and derive the CSI based on channel measurement and interference measurement.

Accordingly, a CSI reported by the UE may correspond to a CSI process. Each CSI process may have an independent CSI feedback configuration. The independent feedback configuration refers to a feedback mode, a feedback period, a feedback offset, etc. The feedback offset corresponds to a start subframe with feedback among subframes in a radio frame. The feedback mode is differently defined according to whether CQI included in feedback CSI among an RI, CQI, a PMI, and a TPMI is CQI for a wideband, CQI for a subband, or CQI for a subband selected by the UE, whether the CSI includes the PMI, and whether the CSI includes a single PMI or a plurality of PMIs.

FIGS. 11(a), 11(b), 11(c), and 11(d) illustrate links configurable according to carrier aggregation and a CoMP environment. In FIG. 11, f1, f2, f3, and f4 correspond to carrier frequencies in which a cell operates when eNB1 and/or eNB 2 communicate with a UE.

Figure 11A:
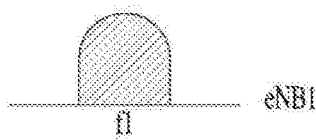
FIGS. 11(a), 11(b), 11(c), and 11(d) illustrate links configurable according to carrier aggregation and a coordinated multi-point transmission/reception (CoMP) environment.
Figure 11B:
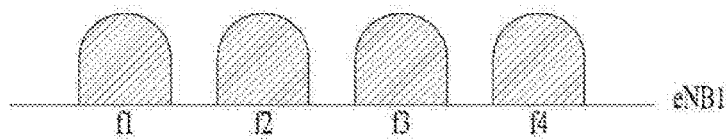

As illustrated in FIG. 11(a), if a UE has a single serving cell, an eNB transmits a 1-bit CSI request field to the UE through DCI format 0 or 4 (hereinafter, DCI format 0/4). As illustrated in FIG. 11(b), if the UE has multiple serving cells in a CA environment, the eNB transmits a 2-bit CSI request field according to Table 12 to the UE through DCI format 0/4. Hence, if the UE has only one serving cell, the CSI request field of DCI format 0/4 may be interpreted as one bit and, if the UE has multiple serving cells in the CA environment, the CSI request field of DCI format 0/4 may be interpreted as 2 bits. That is, if a CoMP mode is not configured, the aperiodic CSI report may be triggered using the 1-bit or 2-bit CSI request field according to whether CA is configured as described above.

However, in a CoMP environment, a plurality of CSIs per serving cell, i.e. a plurality of CSI processes, may be configured as described previously. In a transmission mode in which one or plural CSIs can be configurable for serving cell c (i.e. a CoMP mode), a method for triggering the aperiodic CSI report is problematic.

Figure 11C:
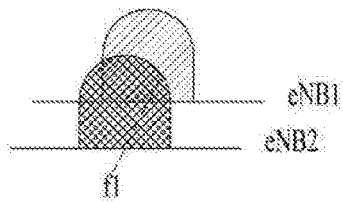

As illustrated in FIG. 11(c), if the UE has a single cell, i.e. if only one serving cell is configured for the UE, and if multiple CSIs for CoMP are configured in the cell, or although not shown, if the UE has a single cell and multiple CSIs for CoMP, i.e. multiple CSI processes, are configured for the cell, it is necessary to determine how to use the CSI request field and how to interpret the CSI request field.

Figure 11D:
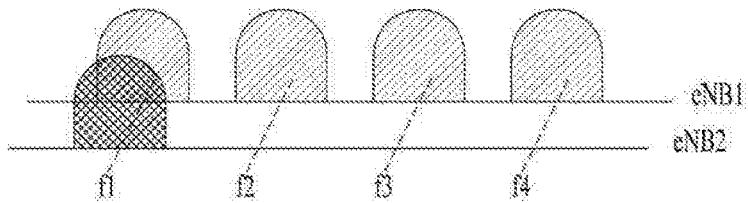

As illustrated in FIG. 11(d), if the UE has multiple serving cells in the CA environment and if multiple CSIs for CoMP, i.e. multiple processes, are configured for some or all serving cells, it is necessary to determine how to use the CSI request field and how to interpret the CSI request field. For convenience, in the present invention, an environment in which the UE has multiple serving cells in the CA environment and multiple CSIs for CoMP, i.e. multiple CSI processes are configured for some or all serving cells will be referred to as a CA+CoMP environment. That is, if the UE is configured by a plurality of serving cells and the UE is configured for a transmission mode in which one or more CSI processes can be configured with respect to at least one of the plurality of serving cells, the UE is considered to be in the CA+CoMP environment. In addition, a serving cell used for both CoMP and CA in the CA+CoMP environment is referred to as a CoMP cell and a cell used only for CA and not used for CoMP is referred to as a non-CoMP cell. Hereinafter, methods for configuring and interpreting the CSI request field in the CA+CoMP environment will be proposed. For convenience of description, although embodiments of the present invention will be described by way of example when CA+CoMP is configured, the embodiments of the present invention are identically applicable when only CoMP is configured without configuring CA. That is, the embodiments of the present invention may be applied to a UE configured in a CoMP mode.

A. Contents of CSI Request Field

Embodiment A of the present invention proposes a CSI request field in a CA+CoMP environment. The CSI request field may consist of two or more bits. The present invention proposes that CSI request(s) for all or some of the following be used in the CSI request field. Here, it is assumed that aperiodic CSI is reported by a PUSCH of serving cell c as described in association with Table 11 and Table 12.

"No aperiodic CSI report is triggered"

"periodic CSI report is triggered for all CSI processes for serving cell c"

"Aperiodic CSI report is triggered for a CSI processes for serving cell c"

"Aperiodic CSI report is triggered for a set of CSI processes for serving cell c"

"Aperiodic CSI report is triggered for a set of CSIs for Pcell"

"Aperiodic CSI report is triggered for all CSI processes for Pcell"

"Aperiodic CSI report is triggered for a set of CSI processes for a serving cell configured by higher layers"

"Aperiodic CSI report is triggered for a set of CSI processes for a set of serving cells configured by higher layers"

"Aperiodic CSI report is triggered for a set of CSI processes for all serving cells"

"Aperiodic CSI report is triggered for the first CSI-RS (or CSI-RS resource+IM resource) set for Pcell"

"Aperiodic CSI report is triggered for the first CSI-RS (or CSI-RS resource+IM resource) set for a serving cell configured by higher layers"

"Aperiodic CSI report is triggered for the first CSI-RS (or CSI-RS resource+IM resource) set for a set of serving cells configured by higher layers"

"Aperiodic CSI report is triggered for the first CSI-RS (or CSI-RS resource+IM resource) set for all serving cells configured by higher layers"

"Aperiodic CSI report is triggered for a set of CSI processes for serving cell c" means that some or all CSI process(es) configured by higher layers (e.g. RRC) are reported among CSI process(es) of serving cell c. If a UE is configured in a CoMP mode, one or more CSI processes may be configured for serving cell c. Upon receiving the CSI request field set to a value corresponding to "Aperiodic CSI report is triggered for a set of CSI processes for serving cell c", the UE performs an aperiodic CSI reporting about a set of CSI process(es) configured by higher layers (e.g. RRC) among the CSI process(es) configured for serving cell c. In addition, "Aperiodic CSI report is triggered for a set of CSI processes for a set of serving cells configured by higher layers' means that some or all CSI process(es) configured by the higher layers are reported among all CSI processes of a set of serving cells configured by the higher layers (e.g. RRC).

CSI(s), which are configured by the higher layers and triggered by the CSI request field set to indicate one of the above descriptions so as to be fed back, may differ according to serving cell c to which a PUSCH carrying the aperiodic CSI report is allocated.

The present invention proposes Table 13 and Table 14 as examples of values which can be set in the CSI request field in the CA+CoMP environment.

TABLE 13

CSI request field for PDCCH with uplink DCI format in UE specific search space

| Value of CSI request field | Description |
| --- | --- |
| '00' | No aperiodic CSI report is triggered |
| '01' | Aperiodic CSI report is triggered for a $1^{st}$ set of CSI processes of serving cell c by higher layers |
| '10' | Aperiodic CSI report is triggered for a $2^{nd}$ set of CSI processes for a $2^{nd}$ set of serving cells configured by higher layers |
| '11' | Aperiodic CSI report is triggered for a $3^{rd}$ set of CSI processes for a $3^{rd}$ set of serving cells configured by higher layers |

TABLE 14

CSI request field for PDCCH with uplink DCI format in UE specific search space

| Value of CSI request field | Description |
| --- | --- |
| '00' | No aperiodic CSI report is triggered |
| '01' | Aperiodic CSI report is triggered for all CSI processes of serving cell c by higher layers |
| '10' | Aperiodic CSI report is triggered for a $2^{nd}$ set of CSI processes for a $2^{nd}$ set of serving cells configured by higher layers |
| '11' | Aperiodic CSI report is triggered for a $3^{rd}$ set of CSI processes for a $3^{rd}$ set of serving cells configured by higher layers |

Upon receiving UL DCI for a specific serving cell in subframe n, that is, upon receiving a UL DCI format in which a CIF is set to a serving cell index of the specific cell, a UE in the CA+CoMP environment may transmit the aperiodic CSI report triggered by the CSI request field on a PUSCH of the specific serving cell in subframe n+k according to Table 13 or Table 14. Referring to Table 13, for example, when the UE receives the CSI request field set to '00' in the CA+CoMP environment, the UE performs no aperiodic CSI reporting on the PUSCH of the specific serving cell. As another example, when the UE receives the CSI request field set to '01' in the CA+CoMP environment, the aperiodic CSI report is triggered for a set of CSI process(es) configured by the higher layers among CSI process(es) of the specific serving cell and the UE performs an aperiodic CSI report for a set of CSI process(es) on the PUSCH of the specific serving cell. The aperiodic CSI report may include CSI(s) about the CSI process(es). As still another example, when the UE receives the CSI request field set to '10' in the CA+CoMP environment, the aperiodic CSI report is triggered for a set of CSI process(es) among all CSI process(es) for a set of serving cell(s) configured by the higher layers. When the UE receives the CSI request field set to '11' in the CA+CoMP environment, the aperiodic CSI report is triggered for a set of CSI process(es) among all CSI process(es) for another set of serving cell(s) configured by the higher layers.

In accordance with Embodiment A of the present invention, CSI request bits may be formed by the same number of bit(s) as bits of a conventional CSI request field even in the CoMP environment.

B. Composition of CSI Request Field

Upon transmission of DCI format 0/4 to the UE through a UE SS in a CA+CoMP and/or CoMP environment, an eNB may use two or more bits for the CSI request field. Therefore, the CSI request field in the CA+CoMP environment and/or the CoMP environment may be configured in many ways. For example, the CSI request field may be configured according to any one of the following schemes.

When the CSI request field is used in the CA+CoMP and/or CoMP environment, one of the bits of the CSI request field may be used for CoMP/CA indication. The bit indicates whether the other bit(s) of the CSI request field are interpreted as the CSI request field for the CoMP environment or as the CSI request field for the CA environment. Accordingly, upon interpreting the CSI request field of received DCI format 0/4, the UE determines, through one specific bit of the CSI request field, whether the other bit(s) of the CSI request field are interpreted as the CSI request field for CoMP or the CSI request field for CA. For example, if the specific bit of the CSI request field is set to '0', the UE may determine for which serving cell the aperiodic CSI report is triggered, based on the other bit(s) of the CSI request field by the scheme described with reference to Table 11 and Table 12. In contrast, if the specific bit of the CSI request field is set to '1', the UE may determine for which CSI processes the aperiodic CSI report is triggered, based on the other bit(s) of the CSI request field by the scheme described in Embodiment A of the present invention.

When the CSI request field is used in the CA+CoMP and/or CoMP environment, partial value(s) of the CSI request field may be fixed to indicate a specific aperiodic CSI report and the other value(s) of the CSI request field may be used to indicate a set of CSI(s), i.e. a set of CSI process(es), configured by the higher layers (e.g. RRC). The set of CSI(s) may be composed of combination of CSI of each non-CoMP cell and multiple CSIs of each CoMP cell. For example, if the value of a 3-bit CSI request field is 000, this means that no aperiodic CSI report is triggered and the other values of the CSI request field may indicate a set of CSI(s) configured by the higher layers. As another example, if the value of the CSI request field is 000, this may indicate that no aperiodic CSI report is triggered, if the value of the CSI request field is 001, this may indicate that the aperiodic CSI report is triggered for a cell used for aperiodic CSI PUSCH transmission, and the other value(s) of the CSI request field may indicate that a set of CSI(s) configured by the higher layers (e.g. RRC) is triggered.

When the CSI request field is used in the CA+CoMP and/or CoMP environment, the CSI request field may be set according to any one of descriptions proposed in Embodiment A of the present invention. Namely, in Embodiment B of the present invention, the CSI request field for CoMP may be provided according to Embodiment A of the present invention. In Embodiment B of the present invention, the CSI request field used in CA may be provided according to a description associated with Table 11 and Table 12. For instance, if the CSI request field for CA consists of one bit, the CSI request field set to '1' triggers the aperiodic CSI report for serving cell c. If the CSI request field used in CA consists of two bits, the aperiodic CSI report corresponding to the values of Table 12 is triggered.

C. Independent Configuration of a Set of CSI(s) in Each Cell or Cell Group

Embodiment C of the present invention proposes that serving cells in the CoMP+CA environment be divided into multiple groups and RRC configuration for a CSI set be independently performed in each group. Alternatively, Embodiment C of the present invention proposes that RRC configuration for a CSI set be independently performed in each serving cell in the CoMP+CA environment. That is, in Embodiment C of the present invention, serving cells transmitting aperiodic CSI PUSCHs in the CoMP+CA environment, i.e. serving cells to which PUSCHs carrying aperiodic CSIs are allocated may be divided into multiple groups and set(s) of CSIs which can be triggered by the CSI request field, i.e. CSI set(s), may be independently configured per serving cell group. It may be interpreted that the same CSI request field value may trigger different CSI sets according to a serving cell group including a serving cell to which a PUSCH carrying the aperiodic CSI report triggered by the CSI request field is mapped. Alternatively, in Embodiment C of the present invention, CSI set(s) which can be triggered by the CSI request field may be independently configured per serving cell.

The CSI request field of each cell or cell group includes values indicating the aperiodic CSI report for CSI sets configured by RRC. Referring to Table 10, sets of serving cells configured by RRC in conventional CA are the same for all serving cells irrespective of which serving cell transmits the aperiodic CSI PUSCH, that is, which serving cell is a cell to which the PUSCH carrying the aperiodic CSI report is mapped. However, according to Embodiment C of the present invention, CSI sets configured by RRC for the CSI request field are the same when the aperiodic CSI PUSCH is triggered for serving cells belonging to the same group but are not always the same for serving cell(s) belonging to different groups when the aperiodic CSI PUSCH is triggered for serving cell(s) belonging to different groups. Alternatively, since CSI set(s) for the CSI request field are independently configured with respect to each serving cell, it cannot be interpreted that the CSI field always triggers report on the same CSI set when serving cells carrying the aperiodic CSI PUSCH are different although the values of the CSI request field are the same in a situation in which serving cells are different.

For example, when four serving cells are present, if cell 1 and cell 2 belong to group 1 and if cell 3 and cell 4 belong to group 2, two RRC configured CSI sets may be {CSI 1, CSI 1+CSI 2} for the case in which the aperiodic CSI PUSCH is triggered for group 1, i.e. for the case in which aperiodic CSI reporting is performed on a PUSCH of a serving cell belonging to group 1, and two RRC configured CSI sets for the case the aperiodic CSI PUSCH is triggered for group 2 may be {CSI 1+CSI 3, CSI 1+CSI 2+CSI 3}. In this case, if the aperiodic CSI PUSCH is triggered for cell 1 or cell 2, a CSI set indicated by the CSI request field may be interpreted as one of {CSI 1, CSI 1+CSI 2} and, if the aperiodic CSI PUSCH is triggered for cell 3 or cell 4, a CSI set indicated by the CSI request field may be interpreted as one of {CSI 1+CSI 3, CSI 1+CSI 2+CSI 3}.

In Embodiment C of the present invention, a CoMP configured UE may interpret the CSI request field according to Embodiment A of the present invention.

D. Use of Different CSI Request Fields for CoMP Cell and Non-CoMP Cell

Embodiment D of the present invention proposes that, if the aperiodic CSI PUSCH is triggered for a CoMP cell, i.e. if aperiodic CSI reporting should be performed on a PUSCH of the CoMP cell, the CSI request field is interpreted as the CSI request field for CoMP and, if the aperiodic CSI PUSCH is triggered for a non-CoMP cell, the CSI request field be interpreted as the CSI request field for CA. According to Embodiment D of the present invention, for example, if the aperiodic CSI PUSCH is triggered for cell f1 in FIG. 11(*d*), i.e. if aperiodic CSI PUSCH is allocated to cell f1, the UE interprets the CSI request field as the CSI request field for CoMP but, if the aperiodic CSI PUSCH is triggered for cells f2, f3, and f4, the UE interprets the CSI request field as the CSI request field for CA.

Figure 12:
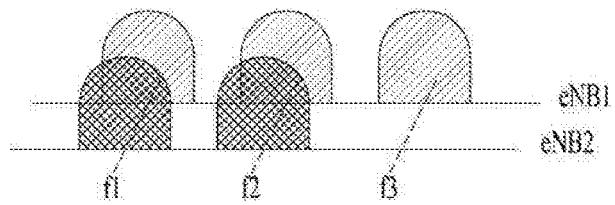
FIG. 12 is a diagram for explaining an embodiment of the present invention.

FIG. 12 is a diagram for explaining an embodiment of the present invention.

Alternatively, as a method for setting the CSI request field in the CA+CoMP environment, Embodiment D of the present invention proposes that, if the aperiodic CSI PUSCH is triggered for a CoMP cell, the CSI request field be interpreted as the CSI request field for CoMP in the CoMP cell and, if the aperiodic CSI PUSCH is triggered for a non –CoMP cell, the CSI request field should be interpreted as the CSI request field for CA. Referring to FIG. 12, when one or more cells performing CoMP are present such that one or more cells configured for a CoMP mode are present, the present invention proposes that, if the aperiodic CSI PUSCH is triggered for cell f1, the CSI request field should be interpreted as the CSI request field for CoMP by considering only a CoMP environment of cell f1, if the aperiodic CSI PUSCH is triggered for cell f2, the CSI request field should be interpreted as the CSI request field for CoMP by considering only a CoMP environment of cell f2, and if the aperiodic CSI PUSCH is triggered for cell f3, the CSI request field should be interpreted as the CSI request field for CA.

In embodiment D of the present invention, the CSI request field for CoMP may be provided according to Embodiment A of the present invention. In embodiment D of the present invention, the CSI request field for CA may be given according to a description associated with Table 11 and Table 12.

E. Use of Subframe Location

Embodiment E of the present invention proposes that the CSI request field in the CA+CoMP environment should be properly used according to a CoMP environment or a CA environment and whether the CSI request field will be interpreted as the CSI request field for CoMP or the CSI request field for CA differ according to the location of a subframe.

In accordance with Embodiment E of the present invention, if a subframe in which a CSI request is transmitted is an odd-numbered (or even-numbered) subframe, the UE may interpret the CSI request as the CSI request field for CoMP and, if the subframe in which the CSI request is transmitted is an even-numbered (or odd-numbered) subframe, the UE may interpret the CSI request as the CSI request field for CA. If the CSI request is transmitted in subframes 0 to 4 (or subframes 5 to 9) among 10 subframes 0 to 9 in a radio frame, the UE may interpret the CSI request as the CSI request field for CoMP and, if the CSI request is transmitted in subframes 5 to 9 (or subframes 0 to 4), the UE may interpret the CSI request as the CSI request field for CA.

In Embodiment E of the present invention, the CSI request field for CoMP may be given according to Embodiment A of the present invention. In Embodiment E of the present invention, the CSI request field for CA may be given according to a description associated with Table 11 and Table 12.

F. Use of Another Field in DCI Format 0/4

Embodiment F of the present invention proposes that the CSI request field in the CA+CoMP environment be properly used according to a CoMP environment or a CA environment and the UE be informed of whether the CSI request field is interpreted as the CSI request field for CoMP or the CSI request field for CA using another field in DCI format 0/4. DCI format 0 is used for scheduling of a PUSCH in one UL cell and DCI format 4 is used for scheduling the PUSCH in one UL cell for a multi-antenna port transmission mode. Table 15 and Table 16 shows DCI which can be transmitted by DCI format 0 and DCI format 4, respectively.

TABLE 15

| Field | Number of bits |
|---|---|
| Carrier indicator (CIF) | 1 or 3 |
| Flag for format 0/format 1A differentiation (0/1A) | 1 |
| Frequency hopping flag (FH) | 1 |
| Hopping resource allocation ($N_{UL\_hop}$) | $N_{UL\_hop}$ |
| Resource block assignment (RA) | $\lceil \log_2(N_{RB}^{UL}(N_{RB}^{UL}+1)/2) \rceil - N_{UL\_hop}$ |
| Modulation and coding scheme and redundancy version (MCS & RV) | 5 |
| New data indicator (NDI) | 1 |
| TPC command for scheduled PUSCH (TPC) | 2 |
| Cyclic shift for DM RS and OCC index (DM RS CS) | 3 |
| CSI request (CSI request) | 1 or 2 |
| SRS request (SRS) | 0 or 1 |
| Resource allocation type (RAT) | 0 or 1 |

TABLE 16

| Field | Number of bits |
|---|---|
| Carrier indicator (CIF) | 1 or 3 |
| Resource block assignment (RA) | $\max\left(\lceil \log_2(N_{RB}^{UL}(N_{RB}^{UL}+1)/2) \rceil, \left\lceil \log_2\left(\binom{\lceil N_{RB}^{UL}/P + 1 \rceil}{4}\right)\right\rceil \right)$ |
| TPC command for scheduled PUSCH (TPC) | 2 |
| Cyclic shift for DM RS and OCC index (DM RS CS) | 3 |
| CSI request (CSI request) | 1 or 2 |
| SRS request (SRS) | 2 |
| Resource allocation type (RAT) | 1 |
| Modulation and coding scheme and redundancy version for transport block 1 (MCS & RV 1) | 5 |
| New data indicator for transport block 1 (NDI1) | 1 |
| Modulation and coding scheme and redundancy version for transport block 2 (MCS & RV 2) | 5 |
| New data indicator for transport block 2 (NDI2) | 1 |
| Precoding information and number of layers (Precoding information) | 3 or 6 |

A bit of any one of the following fields may be used to indicate whether the CSI request field is interpreted as the CSI request field for CoMP or the CSI request field for CA.

"Cyclic shift for DM RS and OCC index field"

A bit of "Cyclic shift for DM RS and OCC index" field among fields in DCI format 0/4 may be used to indicate whether the CSI request field is interpreted as the CSI request field for CoMP or the CSI request field for CA.

When the aperiodic CSI report is requested by the UE in the CoMP+CA environment, the eNB transmits the CSI request to the UE and simultaneously informs the UE of whether the CSI request field is interpreted as the CSI request field for CoMP or the CSI request field for CA using one bit of "Cyclic shift for DM RS and OCC index" field. If the aperiodic CSI report is requested through the CSI request field in the CoMP+CA environment, the UE determines whether the CSI request field is interpreted as the CSI request field for CoMP or the CSI request field for CA using one determined bit of "Cyclic shift for DM RS and OCC index" field in DCI including the CSI request field.

As another method using "Cyclic shift for DM RS and OCC index" field of DCI format 0/4 in order to inform the UE of whether the CSI request field is interpreted as the CSI request field for CoMP or the CSI request field for CA, a method is proposed for determining whether the CSI request field is interpreted as the CSI request field for CoMP or the CSI request field for CA according to values of "Cyclic shift for DM RS and OCC index" field of 3 bits. For example, the values of "Cyclic shift for DM RS and OCC index" field are as follows.

TABLE 17

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

Referring to Table 17, if the value of "Cyclic shift for DM RS and OCC index" field is one of four values among 8 values 000 to 111 taken in "Cyclic shift for DM RS and OCC index" field, the UE may interpret the CSI request field as the CSI request field for CoMP and, if the value of "Cyclic shift for DM RS and OCC index" field is one of the other four values, the UE may interpret the CSI request field as the CSI request field for CA. For example, if the value of "Cyclic shift for DM RS and OCC index" field is one of {000, 001, 010, and 011}, the UE may interpret the CSI request field as the CSI request field for CoMP and if "Cyclic shift for DM RS and OCC index" field has one of values {100, 101, 110, and 111}, the UE may interpret the CSI request field as the CSI request field for CA.

"Resource block assignment and hopping resource allocation field/resource block assignment field"

A bit of "Resource block assignment and hopping resource allocation" field of DCI format 0 and/or a bit of "Resource block assignment" field of DCI format 4 may be used as a bit for indicating whether the CSI request field is interpreted as the CSI request field for CoMP or the CSI request field for CA. When the aperiodic CSI report is requested by the UE in the CoMP+CA environment, the eNB transmits the CSI request to the UE and simultaneously informs the UE of whether the CSI request field is interpreted as the CSI request field for CoMP or the CSI request field for CA using one bit of "Resource block assignment and hopping resource allocation/Resource block assignment" field. If the aperiodic CSI report is requested through the CSI request field in the CoMP+CA environment, the UE determines whether the CSI request field is interpreted as the CSI request field for CoMP or the CSI request field for CA using one determined bit of "Resource block assignment and hopping resource allocation field/Resource block assignment" field in DCI including the CSI request field.

Resource Allocation Type Field

A bit of "Resource allocation type" field may be used as a bit for indicating whether the CSI request field is interpreted as the CSI request field for CoMP or the CSI request field for CA. When the aperiodic CSI report is requested by the UE in the CoMP+CA environment, the eNB transmits the CSI request to the UE and simultaneously informs the UE of whether the CSI request field is interpreted as the CSI request field for CoMP or the CSI request field for CA using the bit of "Resource allocation type" field. If the aperiodic CSI report is requested through the CSI request field in the CoMP+CA environment, the UE determines whether the CSI request field is interpreted as the CSI request field for CoMP or the CSI request field for CA using the bit of "Resource allocation type" field in the DCI including CSI request field. If the bit of "Resource allocation type" field is used to indicate whether the CSI request field is interpreted as the DCI request field for CoMP or the DCI request field for CA, a resource allocation type of a PUSCH may be a prescheduled default mode or an RRC configured mode. Alternatively, a resource allocation type used in previous PUSCH transmission may be used as the resource allocation type of the PUSCH carrying the aperiodic CSI report triggered by the CSI request field.

Embodiment F of the present invention proposes that bit(s) of another field in DCI format 0/4 be used in order to determine whether a 2-bit CSI request field is interpreted as the CSI request field for CoMP of a specific cell or the CSI request field for CA when one or more cells performing CoMP are present as illustrated in FIG. 12. Especially, Embodiment F of the present invention proposes that whether the CSI request field is interpreted as the CSI request field for CoMP of the specific cell or the CSI request field for CA be determined using "Cyclic shift for DM RS and OCC index" field. The UE determines whether the CSI request field is interpreted as the CSI request field for CoMP of the specific cell or the CSI request field for CA according to values of "Cyclic shift for DM RS and OCC index" field of 3 bits.

For instance, when two or more cells performing CoMP are present as illustrated in FIG. 12, 8 values 000 to 111 of "Cyclic shift for DM RS and OCC index" field are divided into 3 sets. If the actual value of "Cyclic shift for DM RS and OCC index" field is one of value(s) belonging to the first set, the UE may interpret the CSI request field as the CSI request field considering only the CoMP environment of cell f1, if the actual value of "Cyclic shift for DM RS and OCC index" field is one of value(s) belonging to the second set, the UE may interpret the CSI request field as the CSI request field considering only the CoMP environment of cell f2, that is, as the CSI request field for CoMP, and if the actual value of "Cyclic shift for DM RS and OCC index" field is one of value(s) belonging to the third set, the UE may interpret the CSI request field as the CSI request field considering only the CA environment, that is, as the CSI request field for CA.

This may be extended as follows. 8 values 000 to 111 which can exist in "Cyclic shift for DM RS and OCC index" field are divided into 'N+1' sets when CoMP is performed in the first cell to N-th cell. If the value of "Cyclic shift for DM RS and OCC index" field is one of values belonging to the n-th (1≤n≤N) set, the UE may interpret the CSI request field as the CSI request field considering only the CoMP environment of the n-th cell in which CoMP is configured and, if the value of "Cyclic shift for DM RS and OCC index" field is one of values belonging to the 'N+1'-th set, the UE may interpret the CSI request field as the CSI request field considering only the CA environment.

Embodiment F of the present invention may be limitedly applied only to the case in which the CSI request field indicates no CSI report and/or aperiodic CSI report on a cell carrying the aperiodic CSI PUSCH.

G. CSI Feedback for Unavailable CSI Request

Embodiment G of the present invention proposes UE operation when aperiodic CSI feedback for CSI not included in a specific cell, i.e. an aperiodic CSI report, is requested to be transmitted through a PUSCH of serving cell c.

If CSI feedback for a set of CoMP CSIs for serving cell a, i.e. CSI feedback for a set of CSI process(es) for serving cell a is requested to be transmitted through the PUSCH of serving cell c, the case in which feedback cannot be performed may occur because CSI for all or some of the set of CoMP CSIs for serving cell a are not valid. In this case, the UE may not perform CSI feedback for all of the requested set of CoMP CSIs or may not perform feedback for only some invalid CSI(s). Alternatively, the UE may perform aperiodic CSI reporting (e.g. aperiodic CSI corresponding to '01' of Table 11) of serving cell a based on a transmission mode in which CoMP is not performed, i.e. transmission mode 9. The UE may feedback all CoMP CSIs of serving cell irrespective of whether CoMP CSIs are valid. The UE may also feedback specific CSI configured by higher layers. Alternatively, the UE may feedback pre-requested CSI for serving cell a.

Figure 13:
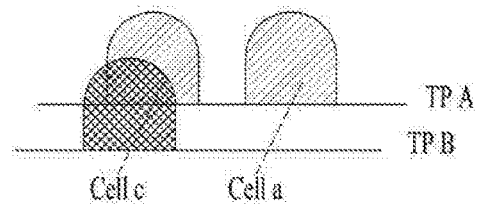
FIG. 13 is a diagram for explaining another embodiment of the present invention.

FIG. 13 is a diagram for explaining another embodiment of the present invention.

Assume that the UE is connected to serving cell c and serving cell a as illustrated in FIG. 13 and these cells transmit signals through transmission point (TP) A. Serving cell c may support UL CoMP using UL carriers of multiple TPs and a DL carrier linked with a UL carrier of TP B which is one of TPs participating in UL CoMP of serving cell c may not be configured for the UE. The UE may receive, through serving cell c or serving cell a, a PUSCH grant, which is a UL grant, indicating that a PUSCH carrying an aperiodic CSI report should be transmitted through serving cell c. If the UE is capable of designating a TP through which a PUSCH of the UE is to be received, through carrier indication (CI) etc., the UE may transmit the PUSCH to TP B by designating TP B. In this case, if the UE is requested to perform aperiodic CSI reporting so as to transmit CSI of a cell to which the PUSCH is allocated, since the UE transmits the PUSCH to TP B, the UE transmits a CSI report for a DL carrier linked with a UL carrier of serving cell c of TP B to TP B. However, since the UE does not use the DL carrier of TP B in serving cell c, the UE does not need to feedback CSI about the DL carrier. At this time, the UE may disregard the CSI request and may not perform feedback at all. That is, in this case, the aperiodic CSI report corresponding to the CSI request may be dropped. Alternatively, the UE may perform CSI reporting on a DL carrier of serving cell c of TP A, which is a TP transmitting a PUSCH grant, among DL carriers of serving cell c.

Figure 14:
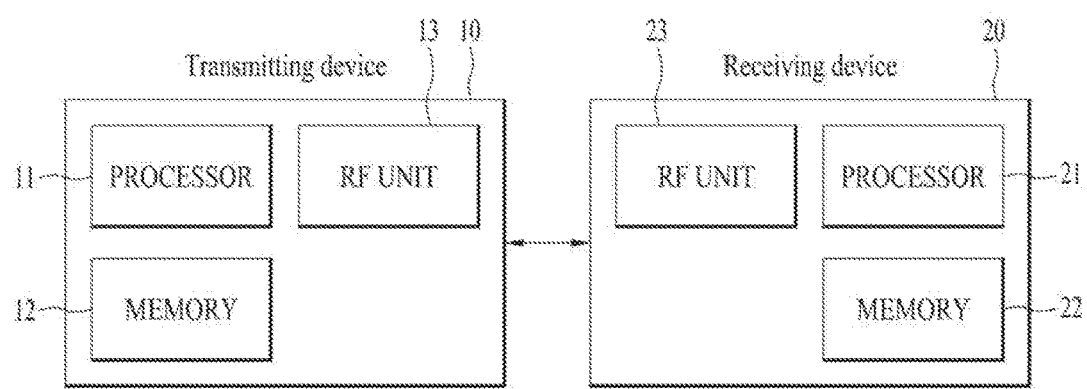
FIG. 14 is a block diagram illustrating elements of a transmitting device 10 and a receiving device 20 for implementing the present invention.

FIG. 14 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

According to the embodiments of the present invention, the eNB processor may generate a higher layer signal, a PDCCH, and/or a PDSCH and control the eNB RF unit to transmit the generated higher layer signal, the PDCCH, and/or the PDSCH. The eNB processor may set a CSI request field in DCI for UL transmission in a specific cell according to any one of the embodiments of the present invention. As an example, if a UE to which DCI is transmitted is configured for a CoMP mode, i.e. if the UE is configured by one or multiple CSI processes per serving cell, the CSI request field of the DCI may be set according to any one of the embodiments of the present invention. The eNB processor may control the eNB RF unit to transmit the DCI on a PUCCH. The UE processor controls the UE RF unit to receive the higher layer signal, the PDCCH, and/or the PDSCH. The UE processor may receive the DCI for a specific cell on the PDCCH. If the DCI includes the CSI request field and a CoMP mode is configured for the UE by the higher layer signal, i.e. if the UE is capable of being configured by one or more CSI processes per serving cell, the UE processor determines the CSI request field according to any one of the embodiments of the present invention. For example, referring to Table 13, if the value of the CSI request included in the DCI about a specific serving cell, received by the RF unit of the UE configured for the CoMP mode is '01', the UE processor may control the UE RF unit to transmit an aperiodic CSI report for a set of CSI process(es) configured by the higher layers (e.g. RRC) among CSI process(es) configured for the specific serving cell. If a subframe in which the DCI is received is subframe n, the UE processor controls the RF unit to transmit the aperiodic CSI report on a PUSCH to the specific serving cell in subframe n+k. For FDD, k may be 4 and, for TDD, k may be given by Table 11. The PUSCH is allocated to the specific cell according to the DCI. Embodiment of the present invention can be applied even when a serving cell to which a PDCCH carrying the DCI is allocated is different from the specific serving cell used for transmission of the aperiodic CSI report.

As described above, the detailed description of the preferred embodiments of the present invention has been given to enable those skilled in the art to implement and practice the invention. Although the invention has been described with reference to exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a BS, a UE, or other devices in a wireless communication system.

The invention claimed is:

1. A method for transmitting, by a user equipment, channel state information (CSI), the method comprising:
   receiving, by the user equipment, downlink control information for a serving cell c, the downlink control information including a CSI request field; and
   performing, by the user equipment, an aperiodic CSI report on a physical uplink shared channel (PUSCH) of the serving cell c,
   wherein the aperiodic CSI report is triggered by the CSI request field set to one of four values,
   wherein, when the user equipment is configured in a mode in which one or more CSI processes can be configured for at least one serving cell, at least one of the four values indicates that aperiodic CSI report is triggered for a set of CSI process(es) for a set of serving cell(s) configured by higher layers,
   and
   wherein each CSI process in the set of CSI process(es) is associated with a CSI reference signal (CSI-RS) resource for signal measurement and an interference measurement resource for interference measurement.

2. The method according to claim 1, wherein:
   the user equipment is configured with a plurality of serving cells including the serving cell c.

3. The method according to claim 1, wherein each CSI in the aperiodic CSI report corresponds to a CSI process.

4. A method for receiving, by a base station, channel state information (CSI), the method comprising:
   transmitting, to a user equipment by the base station, downlink control information for a serving cell c, the downlink control information including a CSI request field; and
   receiving, from the user equipment by the base station, an aperiodic CSI report on a physical uplink shared channel (PUSCH) of the serving cell c,
   wherein the aperiodic CSI report is triggered by the CSI request field set to one of four values,
   wherein, when the user equipment is configured in a mode in which one or more CSI processes can be configured for at least one serving cell, at least one of the four values indicates that aperiodic CSI report is triggered for a set of CSI process(es) for a set of serving cell(s) configured by higher layers, and wherein each CSI process in the set of CSI process(es) is associated with a CSI reference signal (CSI-RS) resource for signal measurement and an interference measurement resource for interference measurement.

5. The method according to claim 4, wherein:
the user equipment is configured with a plurality of serving cells including the serving cell c.

6. The method according to claim 4, wherein each CSI in the aperiodic CSI report corresponds to a CSI process.

7. A user equipment for transmitting channel state information (CSI), the user equipment comprising:
a radio frequency (RF) unit, and
a processor configured to control the RF unit, the processor configured to:
control the RF unit to receive downlink control information for a serving cell c, the downlink control information including a CSI request field; and
control the RF unit to perform an aperiodic CSI report on a physical uplink shared channel (PUSCH) of the serving cell c,
wherein the aperiodic CSI report is triggered by the CSI request field set to one of four values,
wherein, when the user equipment is configured in a mode in which one or more CSI processes can be configured for at least one serving cell, at least one of the four values indicates that the aperiodic CSI report is triggered for a set of CSI process(es) for a set of serving cell(s) configured by higher layers,
and
wherein each CSI process in the set of CSI process(es) is associated with a CSI reference signal (CSI-RS) resource for signal measurement and an interference measurement resource for interference measurement.

8. The user equipment according to claim 7, wherein:
the user equipment is configured with a plurality of serving cells including the serving cell c.

9. The user equipment according to claim 7, wherein each CSI in the aperiodic CSI report corresponds to a CSI process.

10. A base station for receiving channel state information (CSI), the base station comprising:
a radio frequency (RF) unit, and
a processor configured to control the RF unit, the processor configured to:
control the RF unit to transmit downlink control information for a serving cell c, the downlink control information including a CSI request field to a user equipment; and
control the RF unit to receive an aperiodic CSI report on a physical uplink shared channel (PUSCH) of the serving cell c from the user equipment,
wherein the aperiodic CSI report is triggered by the CSI request field set to one of four values,
wherein, when the user equipment is configured in a mode in which one or more CSI processes can be configured for at least one serving cell, at least one of the four values indicates that the aperiodic CSI report is triggered for a set of CSI process(es) for a set of serving cell(s) configured by higher layers,
and
wherein each CSI process in the set of CSI process(es) is associated with a CSI reference signal (CSI-RS) resource for signal measurement and an interference measurement resource for interference measurement.

11. The base station according to claim 10, wherein:
the user equipment is configured with a plurality of serving cells including the serving cell c.

12. The base station according to claim 10, wherein each CSI in the aperiodic CSI report corresponds to a CSI process.

* * * * *